United States Patent
Yoneta

(10) Patent No.: US 11,921,027 B2
(45) Date of Patent: Mar. 5, 2024

(54) METHOD FOR INTRODUCING LIQUID SAMPLES INTO SAMPLE PROCESSING DEVICE

(71) Applicant: KYOCERA Corporation, Kyoto (JP)

(72) Inventor: Masashi Yoneta, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 476 days.

(21) Appl. No.: 17/277,755

(22) PCT Filed: Sep. 24, 2019

(86) PCT No.: PCT/JP2019/037300
§ 371 (c)(1),
(2) Date: Mar. 19, 2021

(87) PCT Pub. No.: WO2020/067024
PCT Pub. Date: Apr. 2, 2020

(65) Prior Publication Data
US 2021/0356378 A1  Nov. 18, 2021

(30) Foreign Application Priority Data
Sep. 25, 2018 (JP) .................. 2018-178936

(51) Int. Cl.
*G01N 15/14* (2006.01)
*G01N 15/00* (2006.01)

(52) U.S. Cl.
CPC . *G01N 15/1404* (2013.01); *G01N 2015/0065* (2013.01); *G01N 2015/149* (2013.01)

(58) Field of Classification Search
None
See application file for complete search history.

(56) References Cited

U.S. PATENT DOCUMENTS

2009/0142845 A1\* 6/2009 Benali ................ B01F 25/4331
  422/68.1
2010/0116661 A1\* 5/2010 Kaji ..................... G01N 27/447
  204/453

(Continued)

FOREIGN PATENT DOCUMENTS

JP  2001-074724 A  3/2001
JP  2011-128042 A  6/2011

*Primary Examiner* — Brandi N Hopkins
*Assistant Examiner* — Nigel H Plumb
(74) *Attorney, Agent, or Firm* — Volpe Koenig

(57) ABSTRACT

A specimen introduction method for improving a measurement accuracy and efficiency includes a preparation step, first step, second step, and third step. The preparation step uses a switching member to connect a first feeder to a first inlet-and-outlet, a second inlet-and-outlet to a discharge container, a third inlet-and-outlet to a first inflow port, and a second feeder to a second inflow port. The first step includes filling a path from the second feeder to the switching member through the second inflow port, a specimen treatment device, and the first inflow port with a second liquid. The second step includes filling a path from the first feeder to the switching member with a first liquid. The third step includes subsequently introducing the first liquid into the first inflow port from the first feeder through the switching member, and introducing the second liquid into the second inflow port from the second feeder.

4 Claims, 15 Drawing Sheets

(56) References Cited

U.S. PATENT DOCUMENTS

2014/0356849 A1* 12/2014 Wikswo ............... B01L 3/5027
                                                  435/284.1
2015/0335769 A1* 11/2015 Sugita ................. A61K 51/088
                                                  422/115

* cited by examiner

F I G. 6
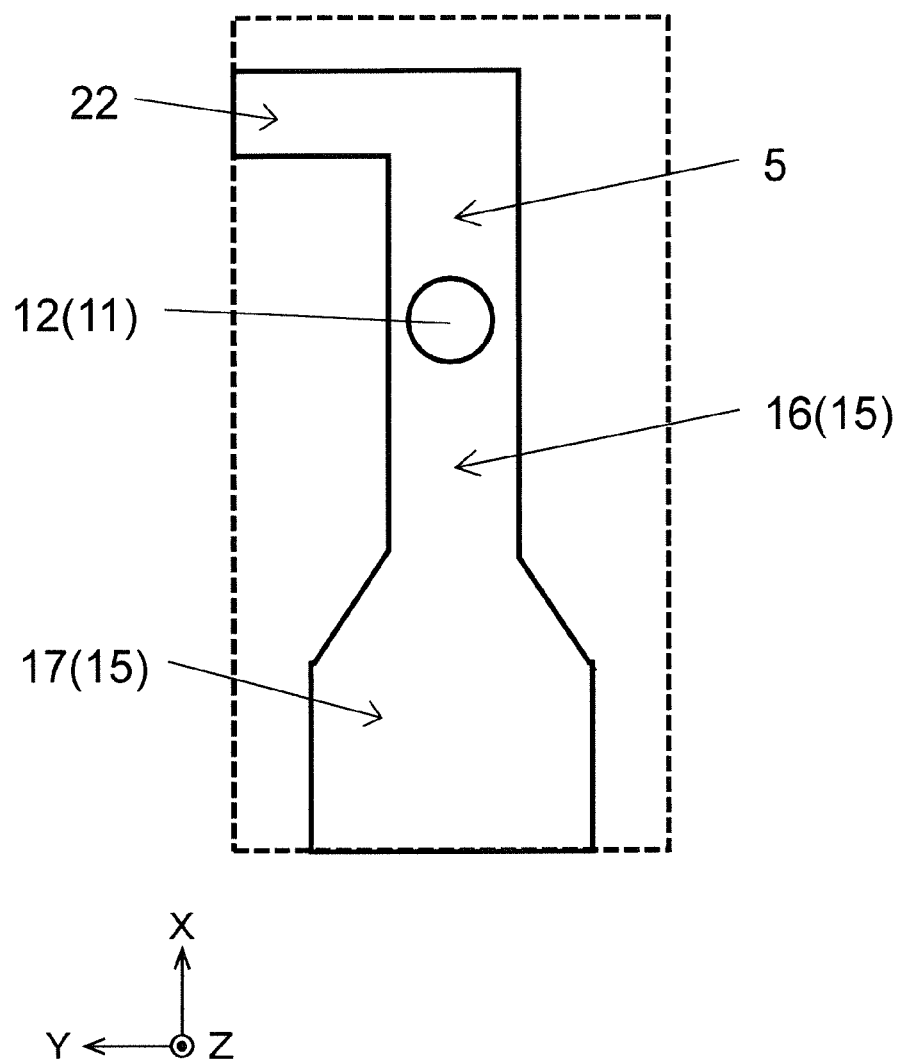

METHOD FOR INTRODUCING LIQUID SAMPLES INTO SAMPLE PROCESSING DEVICE

CROSS-REFERENCE TO RELATED APPLICATION

The present application is a National Phase entry based on PCT Application No. PCT/JP2019/037300 filed on Sep. 24, 2019, entitled "METHOD FOR INTRODUCING SAMPLE INTO SAMPLE PROCESSING DEVICE", which claims the benefit of Japanese Patent Application No. 2018-178936, filed on Sep. 25, 2018, entitled "METHOD FOR INTRODUCING SAMPLE INTO SAMPLE PROCESSING DEVICE". The contents of which are incorporated by reference herein in their entirety.

FIELD

Embodiments of the present disclosure relate generally to a method for introducing a specimen, which is a liquid sample to be tested or test-pretreated, into a specimen treatment device for the test or pretreatment.

BACKGROUND

It is known that, for example, the liquid to be tested such as blood and a liquid to be compared such as a reagent for testing or physiological saline for, for example, calibration, dilution, or transport are supplied to a specimen treatment device such as a reaction apparatus or a microchip having what is called a micro flow path and various tests or measurements are performed on the liquid to be tested.

SUMMARY

A method for introducing a specimen into a specimen treatment device is disclosed. In one embodiment, a method for introducing a specimen into the specimen treatment device of the present disclosure is a method for introducing a first liquid being the specimen to be tested and a second liquid to be compared into a first inflow port and a second inflow port of the specimen treatment device respectively, the specimen treatment device including the first inflow port and the second inflow port being internally configured to flow a liquid between the first inflow port and the second inflow port. This specimen introduction method includes following preparation step and first to third steps.

The preparation step of, by using a switching member configured to switch a flow path of a liquid between two inlet-and-outlets of a first to third inlet-and-outlets, connecting a first feeder configured to supply a first liquid to the first inlet-and-outlet, connecting the second inlet-and-outlet to a discharge container, and connecting the third inlet-and-outlet to a first inflow port of a specimen treatment device, and further connecting a second feeder configured to supply a second liquid to a second inflow port of the specimen treatment device.

The first step of making the switching member capable of flowing a liquid between the second inlet-and-outlet and the third inlet-and-outlet, and sending out the second liquid from the second feeder to the discharge container through the second inflow port, the specimen treatment device, the first inflow port, and the switching member to fill a path from the second feeder to the switching member with the second liquid.

The second step of making the switching member capable of flowing a liquid between the first inlet-and-outlet and the second inlet-and-outlet, and sending out the first liquid from the first feeder to the discharge container through the switching member to fill a path from the first feeder to the switching member with the first liquid.

The third step of subsequently making the switching member capable of flowing a liquid between the first inlet-and-outlet and the third inlet-and-outlet, sending out the first liquid from the first feeder through the switching member to introduce the first liquid into the first inflow port, and sending out the second liquid from the second feeder to introduce the second liquid into the second inflow port.

BRIEF DESCRIPTION OF THE DRAWINGS

FIG. 6 illustrates a top view showing a part of an example of a measuring apparatus as a specimen treatment device in the specimen introduction method of the present disclosure.

FIG. 8A illustrates a cross-sectional view of the example of the measuring apparatus, and FIG. 8B illustrates a diagram showing a measurement mechanism.

DETAILED DESCRIPTION

When the liquid to be tested and the liquid to be compared are supplied to the specimen treatment device, a tube or the like for introducing each liquid is connected to the inflow port of the specimen treatment device, and the liquid is introduced to flow in, and supplied. However, since it is difficult to fill in advance the tube or the like connected to the specimen treatment device with the liquid to be introduced, it is necessary to connect the tube to the specimen treatment device and then to expel the air in the tube to fill the liquid to introduce each liquid in a stable state.

Therefore, when introducing the liquid to be tested and the liquid to be compared into the specimen treatment device, it is required to connect the tube and then to introduce each liquid efficiently and stably.

Hereinafter, an example of an embodiment of the method for introducing a specimen into the specimen treatment device of the present disclosure and an example of a measuring apparatus as a specimen treatment device to which this specimen introduction method is applied will be described with reference to the drawings. In the present disclosure, for convenience, a rectangular coordinate system (X, Y, Z) is defined so that the positive side in the Z-axis direction is upward, but any direction may be upward or downward. The following content exemplifies the embodiments of the present disclosure, and the present disclosure is not limited to these embodiments.

(Schematic Configuration in Method for Introducing Specimen into Specimen Treatment Device)

Figure 1:
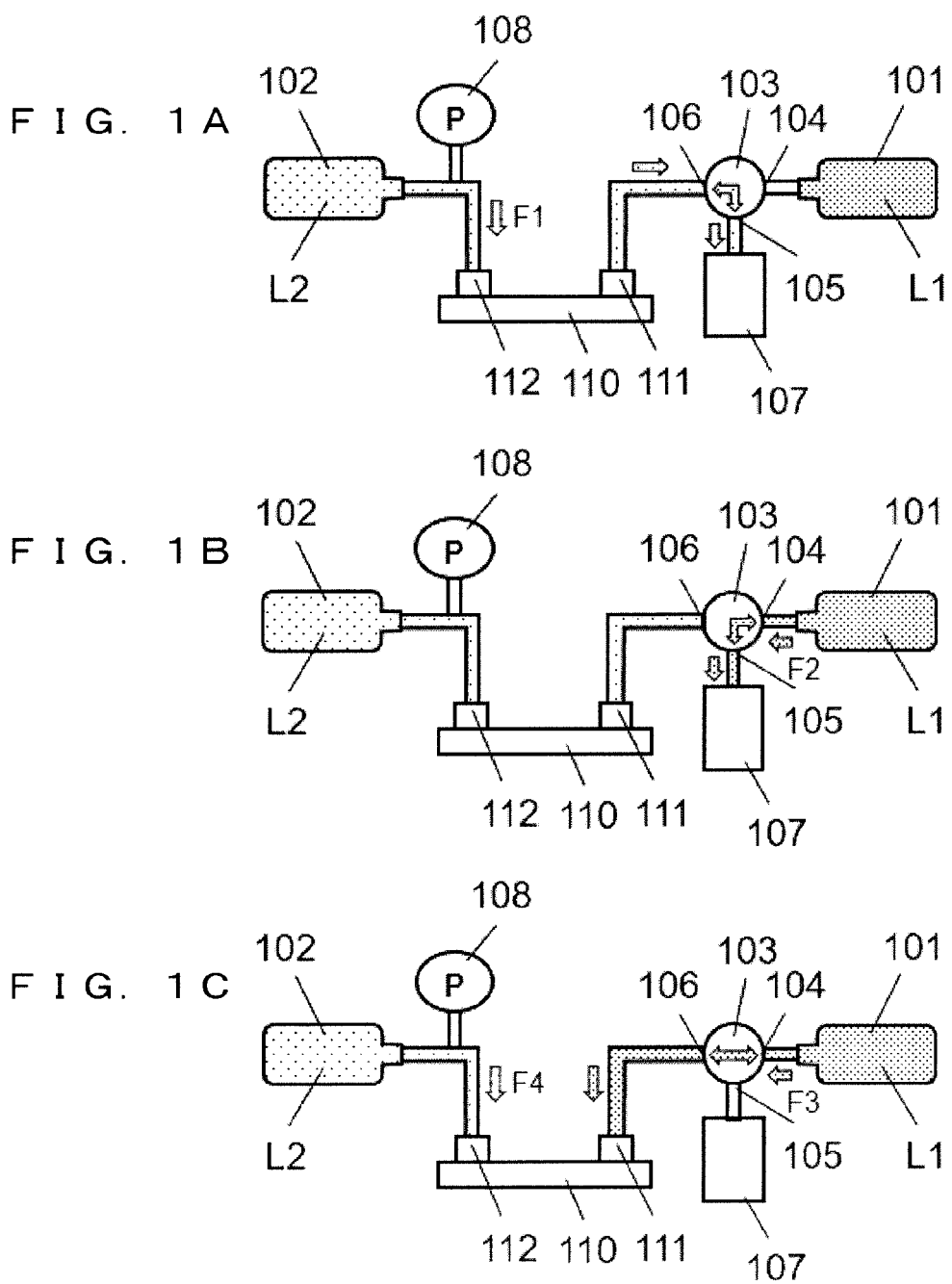
FIGS. 1A to 1C illustrate front views each showing a schematic configuration of an example of an embodiment in a method for introducing a specimen into a specimen treatment device of the present disclosure.

FIGS. 1A to 1C illustrate front views each showing a schematic configuration of an example of an embodiment in the method for introducing a specimen into the specimen treatment device of the present disclosure. The specimen introduction method of the present disclosure is a method for introducing the first liquid L1 being the specimen to be tested and the second liquid L2 to be compared into a first inflow port 111 and a second inflow port 112 of the specimen treatment device 110. The specimen treatment device 110 includes the first inflow port 111 and the second inflow port 112. The specimen treatment device 110 is internally configured to flow a liquid between the first inflow port 111 and the second inflow port 112. First, in the preparation step, by using a switching member 103 that can switch the flow of liquid between two inlet-and-outlets of the first to third inlet-and-outlets 104 to 106, the first feeder 101 for supplying the first liquid L1 is connected to the first inlet-and-outlet 104, the second inlet-and-outlet 105 is connected to the discharge container 107, and the third inlet-and-outlet 106 is connected to the first inflow port 111, and further the second feeder 102 for supplying the second liquid L2 is connected to the second inflow port 112.

Next, in the first step, as shown in FIG. 1A, the switching member 103 is made capable of flowing a liquid between the second inlet-and-outlet 105 and the third inlet-and-outlet 106, and the second liquid L2 is sent out from the second feeder 102 to the discharge container 107 through the second inflow port 112, the specimen treatment device 110, the first inflow port 111, and the switching member 103 to fill a path from the second feeder 102 to the switching member 103 with the second liquid L2.

It should be noted that in FIGS. 1A to 1C, the existence of the first liquid L1 is shown by arranging a fine dot pattern, and the existence of the second liquid L2 is shown by arranging a coarse dot pattern. In addition, in FIGS. 1A to 1C, the arrow with the fine dot pattern in the figure indicates the flow of the first liquid L1, and the arrow with the coarse dot pattern indicates the flow of the second liquid L2.

At this time, in the specimen treatment device 110, the desired portion of the internal flow path between the second inflow port 112 and the first inflow port 111 is also filled with the second liquid L2, and it is preferable that air or the like be not mixed in the flow path as bubbles. Thus, the treatment in the specimen treatment device 110 after the specimen is introduced can be performed normally and stably.

Next, in the second step, as shown in FIG. 1B, the switching member 103 is made capable of flowing a liquid between the first inlet-and-outlet 104 and the second inlet-and-outlet 105, and the first liquid L1 is sent out from the first feeder 101 to the discharge container 107 through the switching member 103 to fill a path from the first feeder 101 to the switching member 103 with the first liquid L1.

Thereafter, in the third step, as shown in FIG. 1C, the switching member 103 is made capable of flowing a liquid between the first inlet-and-outlet 104 and the third inlet-and-outlet 106, the first liquid L1 is sent out from the first feeder 101 to be introduced into the first inflow port 111 through the switching member 103, and the second liquid L2 is sent out from the second feeder 102 to be introduced into the second inflow port 112. Thus, a path from the first feeder 101 to the first inflow port 111 of the specimen treatment device 110 through the switching member 103 is filled with the first liquid L1, a path from the second feeder 102 to the second inflow port 112 of the specimen treatment device 110 is filled with the second liquid L2, and then the first liquid L1 and the second liquid L2 can be efficiently and stably introduced into the specimen treatment device 110 from the first feeder 101 and the second feeder 102, respectively.

The first liquid L1 being the specimen to be tested includes, as a target, a variety of liquids containing predetermined particles for performing a desired treatment or measuring the concentration. For example, the first liquid L1 includes the blood for a blood test, or a liquid containing a specific component or particle desired to be detected. In addition, the first liquid L1 may include a cell suspension containing predetermined cells, or a two-phase mixed solution in which predetermined particles and water are mixed.

On the other hand, when a blood test is performed, the second liquid L2 to be compared is, for example, phosphate buffered saline (PBS) or various reagents. In addition, when the first liquid L1 is a liquid containing a specific component or particles desired to be detected, the second liquid L2 to be compared is, for example, pure water or various reagents that do not contain them. That is, the liquid to be compared includes not only the liquid having the meaning of being simply compared with the first liquid L1, but also the liquid for introduction treatment for expelling air from the introduction path of the liquid to introduce the first liquid L1 to be tested in a state of not containing air bubbles into the specimen treatment device 110 or the liquid containing a substance that reacts with the first liquid L1 and contributes to the test.

It should be noted that in FIGS. 1A to 1C, a pressure gauge 108 with a letter P monitors the pressure of the second liquid L2 in the path from the second feeder 102 to the second inflow port 112. When the second liquid L2 is sent out from the second feeder 102, the pressure of the second liquid L2 rises when clogging occurs in the path to the second inflow port 112 or in a flow path in the specimen treatment device 110. In response to this, detecting the pressure rise of the second liquid L2 to perform control such as stopping the supply of liquid makes it possible to reduce the occurrence of accidents such as the tube or pipe being torn or detached and the second liquid L2 being scattered due to the application of pressure exceeding the permissible value to the tube or pipe connecting the second feeder 102 and the second inflow port 112. Such a pressure gauge 108 may be provided in the path between the first feeder 101 and the first inflow port 111 and used in the same manner.

The first feeder 101 can store and supply a predetermined amount of the first liquid L1 as needed, and similarly, the second feeder 102 can store and supply a predetermined amount of the second liquid L2 as needed. As these first feeder 101 and second feeder 102, various things can be used as long as they can supply the liquid stably at a predetermined pressure and a predetermined flow rate, such as a syringe (a syringe barrel of a syringe), a syringe pump, or an infusion pump. In addition, since the first liquid L1 being the specimen to be tested is normally collected as a limited amount of samples, the first feeder 101 is used individually for each of these small amounts of samples. On the other hand, since the same liquid is usually used for the second liquid L2, one that can continuously supply the second liquid L2 from a container that stores a large amount of the second liquid L2 may be used for the second feeder 102.

In addition, as the materials of the first feeder 101 and the second feeder 102, various materials can be used as long as they are stable materials that do not react with the first liquid L1 and the second liquid L2, respectively, and are not particularly limited.

The volume of the first feeder 101 that supplies the first liquid L1 needs to be large enough to store the minimum amount of liquid necessary for separating particles such as blood cells in the specimen treatment device. For example, since a specimen having an amount of about 1 to 1.5 mL is required, when the first liquid L1 is stored in the first feeder 101 in advance, it is sufficient that the first feeder 101 has a size that can secure preferably 1.5 mL or more, and more preferably, 2 mL or more as the predetermined amount of the first liquid L1. In addition, when white blood cells are tested using blood as the first liquid L1, although it depends on the diluted amount of blood, since it is difficult to measure the concentration by good optical test unless the white blood cell concentration is $5\times10^5$ cells/mL or more, it is preferable that the first feeder 101 can secure 1 to 1.5 mL as a predetermined amount so that 1 mL can be secured by, for example, 10-fold dilution.

It should be noted that since the switching member 103, a tube or a pipe and the like are interposed between the first feeder 101 and the first inflow port 111, and a tube, a pipe or the like is also interposed between the second feeder 102 and the second inflow port 112, an amount of liquid that fills the inside of them is also required, so that it is necessary to secure the above predetermined amount also in consideration of them. Therefore, it is preferable to keep the tube, the pipe or the like serving as the connection path as short as possible. In addition, it is preferable to have a configuration in which the first feeder 101, the switching member 103, and the first inflow port 111 are directly connected to each other without a tube or a pipe, and the second feeder 102 and the second inflow port 112 are directly connected to each other without a tube or a pipe.

It should be noted that in the example shown in FIGS. 1A to 1C, each of the first feeder 101 and the second feeder 102 is arranged sideways (horizontally) to supply each liquid, but when the first feeder 101 and the second feeder 102 are arranged such that, for example, their respective supply ports face vertically downward to supply each liquid also using gravity, it is preferable because the supply of the specimen by the first liquid L1 and the supply of the second liquid L2 can be efficiently performed. Thus, various forms can be adopted for the arrangement of the first feeder 101 and the second feeder 102.

For the switching member 103, for example, a three-way valve or the like may be used. In particular, it is preferable that the used is the switching member 103, which is referred to as T-port type, capable of switching to connect the flow paths in a L shape between the first inlet-and-outlet 104 and the second inlet-and-outlet 105 or between the second inlet-and-outlet 105 and the third inlet-and-outlet 106, or in a straight shape between the first inlet-and-outlet 104 and the third inlet-and-outlet 106, for two inlet-and-outlets among the first to third inlet-and-outlets 104 to 106. In addition, regarding the switching of the flow path between each of the inlet-and-outlets, various configurations may be adopted as needed, such as one that switches manually, one that switches using electricity such as a solenoid valve, one that switches using opening and closing by a piezoelectric member such as a piezo element, or one that switches using opening and closing the valve with the air pressure.

Regarding the discharge container 107, various containers can be used and are not particularly limited as long as they can accept each of the first liquid L1 and the second liquid L2 sent out through the switching member 103 in the first step and the second step.

For example, the discharge container 107 may be a container such as a tank having a large capacity into which liquids from a plurality of switching members 103 through tubes or the like are collected. According to this, when a large number of specimens are treated in parallel, it is possible to collectively and efficiently treat them in one discharge container 107, rather than preparing a plurality of discharge containers 107 for each specimen, and it is preferable because it is advantageous also from the viewpoint of maintenance.

The specimen treatment device 110 includes, for example, a measuring apparatus for measuring specific particles in a liquid as described below, and various devices for performing treatment such as separation, measurement, or test on the first liquid L1.

In the specimen introduction method of the present disclosure, as shown in FIGS. 1A to 1C, when the flow rate for sending out the second liquid L2 from the second feeder 102 in the first step is defined as the first flow rate F1, the flow rate for sending out the first liquid L1 from the first feeder 101 in the second step is defined as the second flow rate F2, and in the third step, the flow rate for sending out the first liquid L1 from the first feeder 101 is defined as the third flow rate F3 and the flow rate for sending out the second liquid L2 from the second feeder 102 is defined as the fourth flow rate F4, it is preferable that the first flow rate F1 be larger than the fourth flow rate F4 (F4<F1) and the second flow rate F2 and the third flow rate F3 be smaller than the fourth flow rate F4 (F2, F3<F4).

If the specimen treatment device 110 is a device that separates white blood cells being specific particles from the blood, for example, as described below, by using blood as the first liquid L1 and using physiological saline as the second liquid L2 for pressing flow, although it depends on the setting conditions of the flow path in the device, for example, it is preferable that the first flow rate F1 be 100 μL/min, the second flow rate F2 and third flow rate F3 be 30 μL/min, and the fourth flow rate F4 be 45 μL/min. In addition, regarding the flow rate ratio between the third flow rate F3 of the first liquid L1 and the fourth flow rate F4 of the second liquid L2 introduced for the separation treatment, it is advisable that F3:F4 is set to a range larger than 1:1 and not more than 1:2. If F3:F4 is 1:1 or less, the action due to the pressing flow may be insufficient and the separation performance may deteriorate, and if F3:F4 exceeds 1:2, the pressing flow becomes too strong and blood cells may jump up in the separation flow path in the specimen treatment device 110, resulting in deteriorating in separation performance.

It should be noted that in order to perform the separation treatment efficiently, if the first liquid L1 being the specimen flows in the absence of the second liquid L2 being the pressing flow, it tends to be difficult to perform the separation treatment well, so that it is desirable to secure that the second liquid L2 flows at the fourth flow rate F4 and then to flow the first liquid L1 at the third flow rate F3.

Then, in the specimen introduction method of the present disclosure, as described below, it is preferable to use, for the specimen treatment device 110, a particle separation device internally including a main flow path and a branch flow path for separating particles in blood, to use blood for the first liquid L1 to be introduced into the first inflow port 111 as a specimen, and to use physiological saline for the second liquid L2 to be introduced into the second inflow port 112 for particle separation. According to this, when the particles in the first liquid L1 are, for example, white blood cells or red blood cells, the first liquid L1 is blood containing them, and the second liquid L2 is physiological saline, the specimen treatment device 110 can suitably separate the particles in the first liquid L1, and when tests such as various measurements are performed following the separation, the separation and test of particles can be stably and efficiently performed.

It should be noted that the blood used for the first liquid L1 does not necessarily have to be the undiluted solution, and for example, 100 to 200 μL of blood may be diluted 5 to 10 times with physiological saline. In addition, not only diluting with physiological saline, but in order to prevent plasma components in blood from adhering or coagulating in the flow path in the specimen treatment device 110, adding an adsorption inhibitor (BSA: bovine serum albumin) that prevents adhesion or an anticoagulant (EDTA: ethylenediaminetetraacetic acid) may be used.

(Measuring Apparatus: Specimen Treatment Device)

Figure 2:
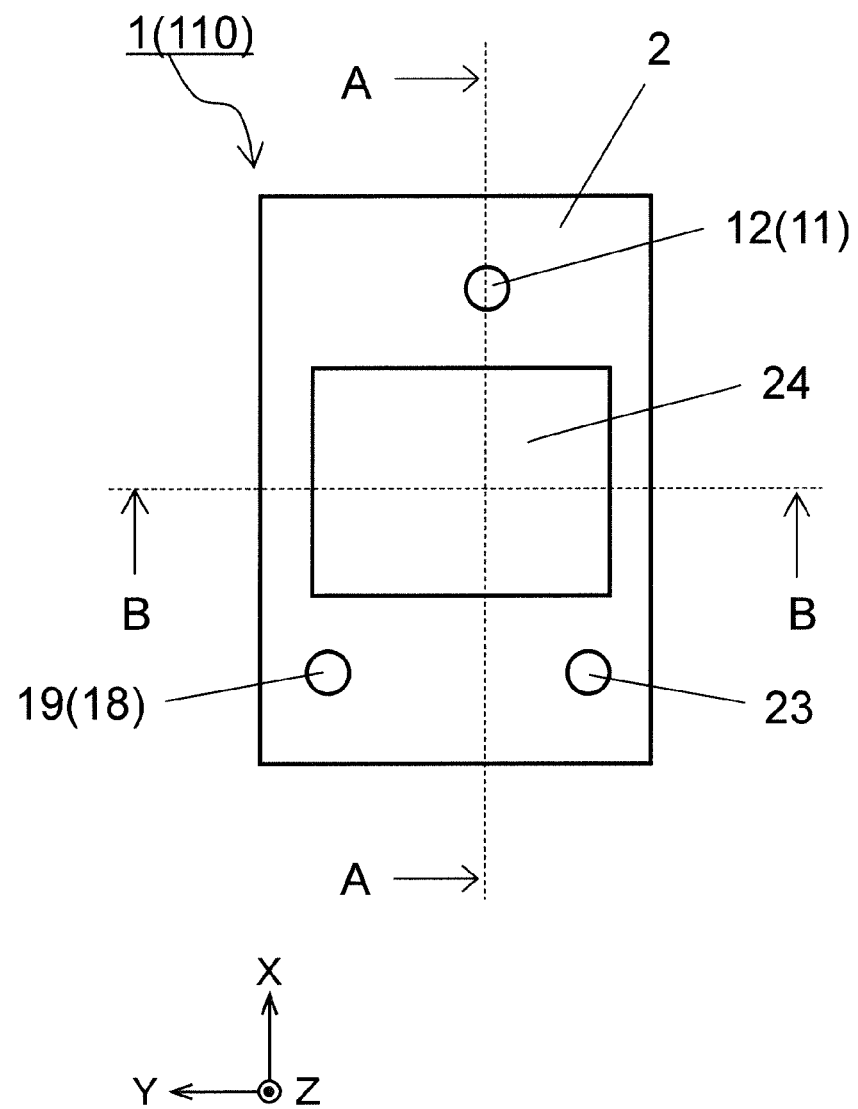
FIG. 2 illustrates a top view showing an example of a measuring apparatus as a specimen treatment device in the specimen introduction method of the present disclosure.
Figure 3:
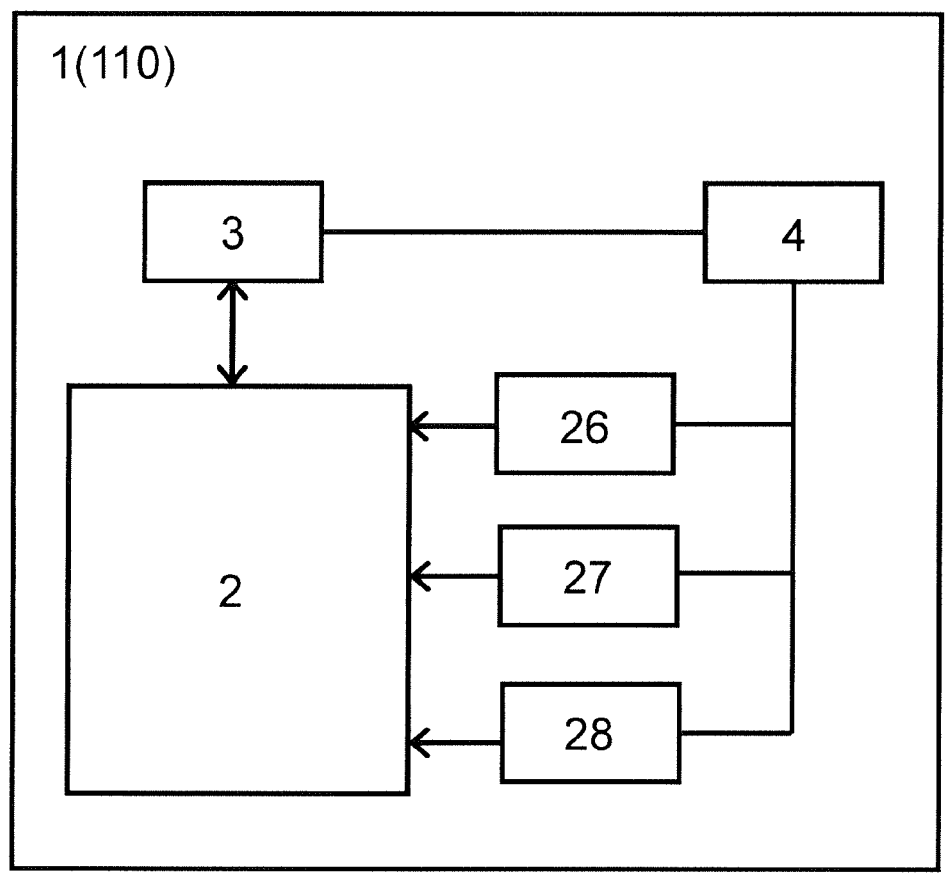
FIG. 3 illustrates a block diagram schematically showing a configuration of an example of a measuring apparatus as a specimen treatment device in the specimen introduction method of the present disclosure.
Figure 4:
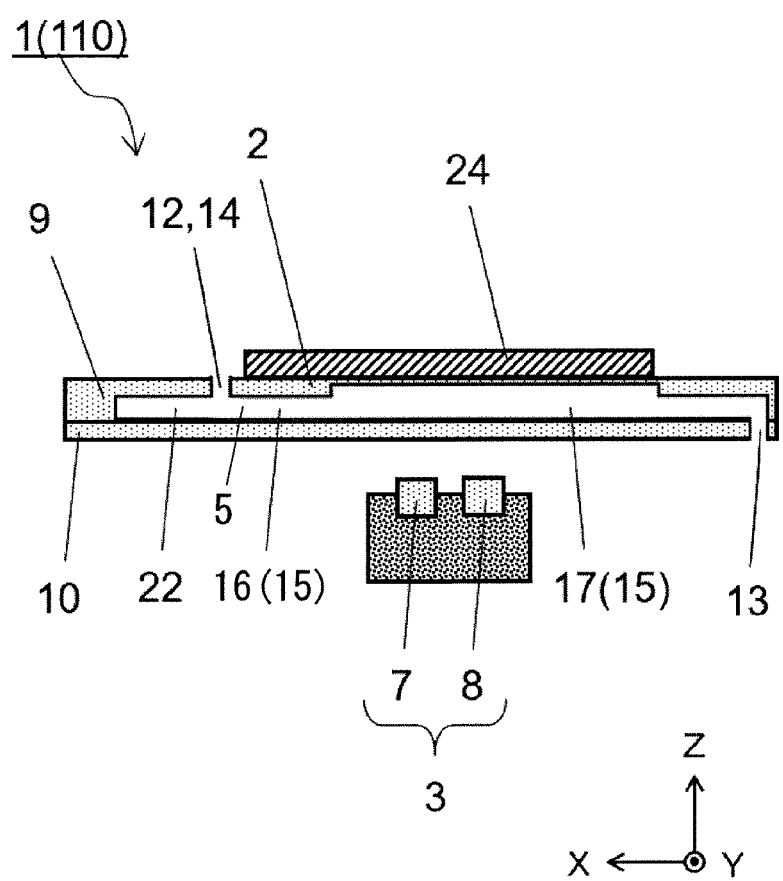
FIG. 4 illustrates a cross-sectional view showing an example of a measuring apparatus as a specimen treatment device in the specimen introduction method of the present disclosure.

FIGS. 2 to 4 show an example of the measuring apparatus 1 being an example of the specimen treatment device 110 to which the specimen introduction method of the present disclosure is applied. FIG. 2 is a top view of the measuring apparatus 1 (110). FIG. 3 is a block diagram schematically showing the configuration of an example of the measuring apparatus 1. FIG. 4 is a cross-sectional view of the measuring apparatus 1, and is a cross-sectional view of the measuring apparatus 1 taken along line A-A in FIG. 2.

The measuring apparatus 1 can measure specific particles in a fluid including a liquid mainly. The measuring apparatus 1 includes a flow path device 2, an optical sensor 3, and a control unit 4. A liquid (fluid) (first liquid L1, for example, blood) containing specific particles (first particles, for example, white blood cells) flows in the flow path device 2.

The optical sensor 3 is arranged to face a predetermined flow path of the flow path device 2, and can irradiate the first liquid L1 with light and receive the light that has passed through the first liquid L1 (light that is reflected after passing, has passed again, and has returned). The control unit 4 can estimate the number of first particles and the like based on the output of the optical sensor 3. It should be noted that the first liquid L1 is a liquid containing particles to be tested, and is normally a specimen.

When the first liquid L1 is irradiated with light from the optical sensor 3, the light passing through the first liquid L1 is reflected, scattered, or absorbed by the first particles, and the intensity of the light is reduced. Then, preparing in advance a calibration curve showing the relationship between the specimen whose number of particles is known and the amount of light attenuation and comparing the light intensity with the calibration curve by the control unit 4 allows the first particles to be measured.

Figure 5:
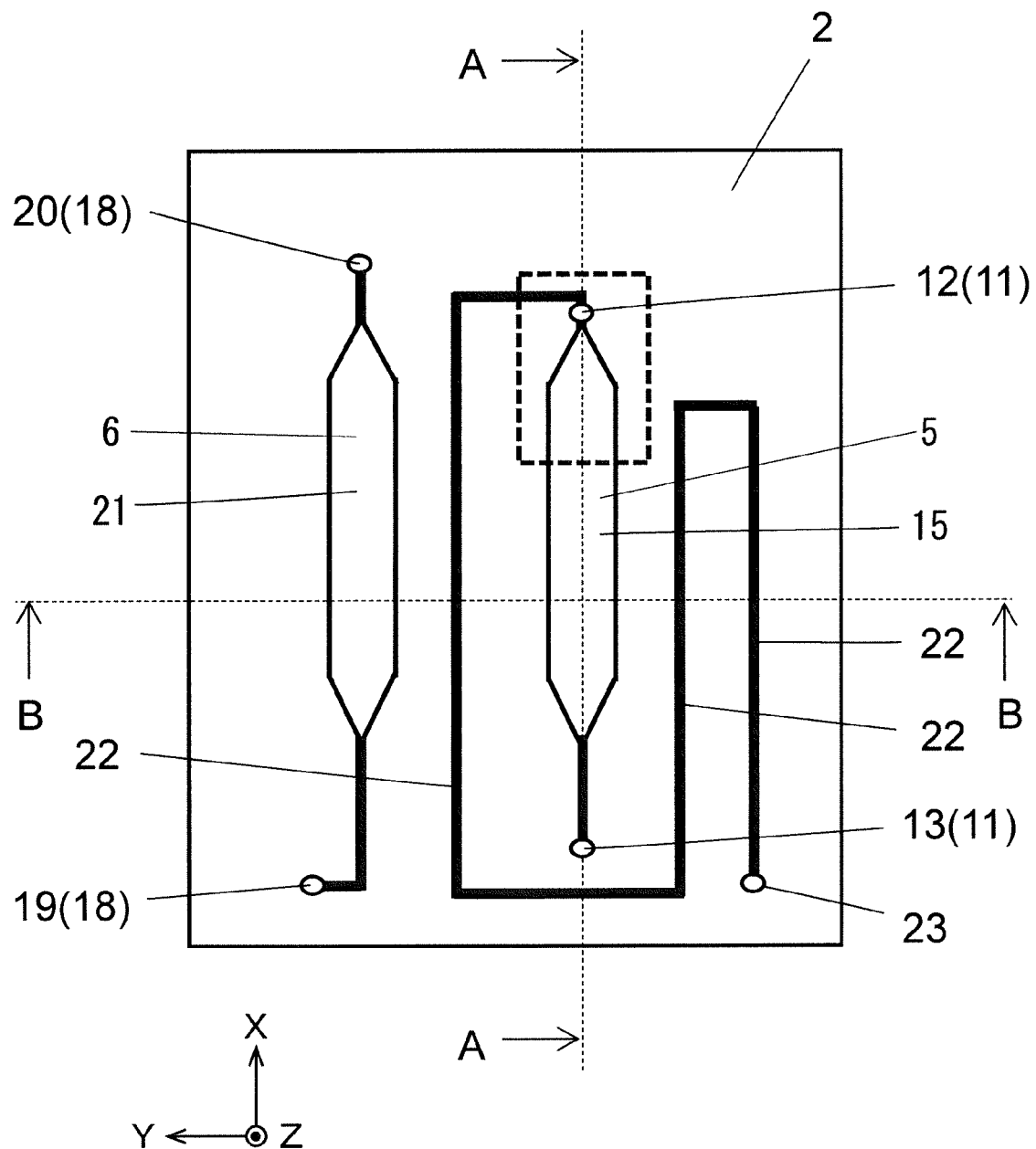
FIG. 5 illustrates a top view showing a part of an example of a measuring apparatus as a specimen treatment device in the specimen introduction method of the present disclosure.

FIG. 5 schematically shows the flow path device 2. FIG. 5 is a plan view of the flow path device 2 when seen through from above. It should be noted that line A-A in FIG. 5 corresponds to line A-A in FIG. 2.

The flow path device 2 is a flow path for measurement for measuring the first particle in the first liquid L1. The flow path device 2 includes a first flow path 5 and a second flow path 6 having translucency. The first liquid L1 to be tested containing the first particles flows through the first flow path 5. The second liquid L2 to be compared and not containing the first particles flows through the second flow path 6. The first flow path 5 is a flow path for measurement, and the second flow path 6 is, for example, a flow path for calibration. It should be noted that the first liquid L1 is a specimen, and blood or the like is assumed, for example. The second liquid L2 is a calibration liquid, and for example, physiological saline can be used.

The optical sensor 3 can sense the first particles. At the time of measurement, the optical sensor 3 irradiates each of the first flow path 5 and the second flow path 6 with light, and also receives the light passing through each of the first flow path 5 and the second flow path 6. The optical sensor 3 includes a light emitting element 7 and a light receiving element 8. It is sufficient that the light emitting element 7 is, for example, a light emitting diode (LED) or a laser diode (LD), and the light emitting element 7 of the present example is an LED. It is sufficient that the light receiving element 8 is, for example, a photo diode (PD).

The control unit 4 controls the measuring apparatus 1. The control unit 4 compares the intensity of the light that has passed through the first flow path 5 (first light), and the intensity of the light that has passed through the second flow path 6 (second light), obtained by the optical sensor 3, thereby being capable of measuring the first particles. That is, the control unit 4 can measure the first particles by calculating the intensity difference between the first light and the second light and comparing the intensity difference between the first light and the second light with the calibration curve.

Here, when the conventional measuring apparatus is used repeatedly, the light emitting element of the optical sensor deteriorates and the intensity of light decreases. That is, when the first particles are measured from the intensity of light by utilizing the dispersion, absorption and the like of the light of the first particles using an optical sensor, the decrease in the light intensity due to, for example, deterioration of the optical element leads to the measurement result that the number of first particles is larger than the original number. On the other hand, in the measuring apparatus 1 of the present disclosure, as described above, since the first particle is measured from the intensity difference between the first light and the second light, the accuracy of measurement can be maintained or improved regardless of the deterioration of the optical element.

(Flow Path Device)

As described above, the flow path device 2 functions as a flow path for measurement. The flow path device 2 has translucency for measuring the first particles with the optical sensor 3. It should be noted that in the flow path device 2, it is sufficient that at least the parts necessary for the measurement of the first flow path 5 and the second flow path 6 are translucent, and not the whole of the flow path device 2 needs to be translucent.

The flow path device 2 has, for example, a plate shape. The flow path device 2 is mainly formed by joining the first substrate 9 and the second substrate 10. Specifically, the flow path device 2 includes a first substrate 9 having a groove and a second substrate 10 arranged on the surface of the first substrate 9. The second substrate 10 closes the opening of the groove of the first substrate 9. That is, the first flow path 5 and the second flow path 6 are formed by the groove of the first substrate 9 and the surface of the second substrate 10. It should be noted that the flow path device 2 may include members other than the first substrate 9 and the second substrate 10.

The first substrate 9 is, for example, a flat plate-shaped member. It is sufficient that the material of the first substrate 9 is, for example, glass, acrylic resin, polycarbonate resin, cyclic olefin copolymer (COC) resin, cycloolefin polymer (COP) resin, polydimethylsiloxane (PDMS) resin, or the like. The material of the first substrate 9 of the present example is PDMS. The refractive index of the first substrate 9 is set to, for example, 1.4 to 1.6.

It is sufficient that the width of the groove of the first substrate 9 is, for example, 500 to 4000 μm (0.5 to 4 mm). It is sufficient that the groove depth is, for example, 100 to 1000 μm (0.1 to 1 mm). It should be noted that the first substrate 9 and the groove of the first substrate 9 can be formed by a conventionally known method. The thickness of the first substrate 9 from the bottom surface of the groove is set to, for example, 0.5 to 1 mm. It should be noted that in the flow path device 2 of the present example, the width and depth of the groove of the first substrate 9 are the same as the width and height of the first flow path 5 and the second flow path 6 respectively. The second substrate 10 is, for example, a flat plate-shaped member. It is sufficient that the material of the second substrate 10 is, for example, glass, acrylic resin, polycarbonate resin, polydimethylsiloxane (PDMS) resin, or the like. The refractive index of the second substrate 10 is set to, for example, 1.4 to 1.6. The material of the second substrate 10 of the present example is glass. The second substrate 10 can be formed by a conventionally known method. The thickness of the second substrate 10 is set to, for example, 0.5 to 1 mm. It should be noted that the thickness of the second substrate 10 is set to be smaller than the thickness of the first substrate 9.

It should be noted that any one of the first substrate 9 and the second substrate 10 may be positioned on the upper side, and in the flow path device 2 of the present example, the first substrate 9 is arranged on the upper surface of the second substrate 10.

FIG. 6 schematically shows a part of the flow path device 2. FIG. 6 is an enlarged plan view of the broken line portion in FIG. 5.

The first flow path 5 is a flow path into which at least the first liquid L1 flows. The first flow path 5 includes a plurality of first openings 11 positioned on both sides of the flow path device 2. It is sufficient that the plurality of first openings 11 are openings at least for the liquid to flow in and out. The plurality of first openings 11 include a first inflow port 12 arranged on the upper surface of the flow path device 2 (upper surface of the first substrate 9), and a first outflow port 13 arranged on the lower surface of the flow path device 2 (lower surface of the second substrate 10). The first inflow port 12 is an opening for the liquid to flow into the first flow path 5. The first outflow port 13 is an opening for the liquid to flow out from the first flow path 5.

The first flow path 5 further includes a vertical portion 14 connected to the first inflow port 12 and extending in the thickness direction and a planar portion 15 connected to the vertical portion 14 and extending along one direction on a plane. The vertical portion 14 is a through hole formed in the first substrate 9. The planar portion 15 is a groove formed in the first substrate 9. It is sufficient that the shape of the cross section (cross section orthogonal to the moving direction of the liquid) of the planar portion 15 is, for example, a rectangular shape. The planar portion 15 may further include a first planar portion 16 connected to the vertical portion 14, and a second planar portion 17 connected to the first planar portion 16 and larger in width than the first planar portion 16. The connecting portion between the first planar portion 16 and the second first planar portion 17 is gradually increased in width. It should be noted that the irradiation region of the light emitting element 7 of the optical sensor 3 is the second planar portion 17.

In addition, the second planar portion 17 may be larger in height than the first planar portion 16. Thus, the first particles can be easily made to diffuse. It is sufficient that the height of the first planar portion 16 is, for example, 0.2 to 1 mm. It is sufficient that the height of the second planar portion 17 is, for example, 1 to 5 mm.

The second flow path 6 is a flow path into which at least the second liquid L2 flows. The second flow path 6 includes a plurality of second openings 18 positioned on any one of the two surfaces of the flow path device 2. It is sufficient that the plurality of second openings 18 are openings at least for the liquid to flow in and out. The plurality of second openings 18 include a second inflow port 19 arranged on the upper surface of the flow path device 2 (upper surface of the first substrate 9), and a second outflow port 20 arranged on the lower surface of the flow path device 2 (lower surface of the second substrate 10).

The second flow path 6 further includes a vertical portion (not shown) connected to the second inflow port 19 and extending in the thickness direction and a third planar portion 21 connected to the vertical portion and extending along one direction on a plane. It is sufficient that part of the third planar portion 21 of the second flow path 6 has at least the same shape as the second planar portion 17 of the first flow path 5, for example. In addition, it is sufficient that the position of part of the third planar portion 21 having the same shape as the second planar portion 17 in the thickness direction is a position the same as that of the first flow path 5, for example. It should be noted that the second flow path 6 does not have to have the same shape and position as the first flow path 5 as long as the second flow path 6 can function as a calibration flow path.

The flow path device 2 may further include a third flow path 22 connected to the first flow path 5, in addition to the first flow path 5. Then, the third flow path 22 may be connected to the planar portion 15 of the first flow path 5. The third flow path 22 has a function of carrying away the specimen that has reached the planar portion 15, for example, by flowing gas or the like. As a result, the retention of the specimen in the first flow path 5 (for example, the planar portion 15) can be reduced.

In the flow path device 2 of the present example, the third flow path 22 is arranged to be connected to the connecting portion between the vertical portion 14 and the planar portion 15 of the first flow path 5. In addition, the third flow path 22 includes a third opening 23 positioned on the surface of the flow path device 2 (in the present example, the upper surface of the first substrate 9). The third opening 23 is an opening for flowing in an extrusion liquid for carrying away the specimen.

The flow path device 2 in the present example may further include a mirror member 24 being a reflection member arranged in a region overlapping the first flow path 5 and the second flow path 6 on the upper surface of the first substrate 9. The mirror member 24 can reflect a part of light emitted from the light emitting element 7 in the optical sensor 3 passing through each of the first flow path 5 and the second flow path 6 to the light receiving element 8 of the optical sensor 3.

In the flow path device 2, arranging a mirror member 24 as a reflection member for reflecting the light emitted by the optical sensor 3 toward the optical sensor 3 in a region, which overlaps with the first flow path 5 and second flow path 6, on the opposite side of the optical sensor 3 with respect to the first flow path 5 and second flow path 6 allows the light emitted by the optical sensor 3 to be efficiently received by the optical sensor 3 through the first flow path 5 and the second flow path 6. In addition, since the mirror member 24 can block the ambient light incident on the first flow path 5 and the second flow path 6 from the side opposite to the optical sensor 3, the accuracy of the measurement by the optical sensor 3 can be sufficiently secured.

It is sufficient that the mirror member 24 is, for example, a thin film member. It is sufficient that the material of the mirror member 24 is a material whose refractive index is different from that of the first substrate 9. The material of the mirror member 24 can be formed of a metal material such as aluminum or gold, or a laminate of dielectric materials such as a dielectric multilayer filter. The refractive index of the mirror member 24 is set to, for example, 1.4 to 1.6. The mirror member 24 can be formed on the upper surface of the first substrate 9 by a method such as a vapor deposition method or a sputtering method.

In addition, in the present example, the mirror member 24 is arranged to overlap with the first flow path 5 and the second flow path 6 as described below, but the mirror member 24 is not limited to the one that covers both of the first flow path 5 and the second flow path 6, and may be arranged separately to overlap with each of the first flow path 5 and the second flow path 6. When the mirror members 24 are arranged separately, a light-shielding member may be arranged between the mirror members 24 in order to block the ambient light. In addition, in order to enhance the effect of blocking ambient light by the mirror member 24, a non-reflective member or a light-shielding member may be placed on the mirror member 24 to prevent the transmission of light from the mirror member 24 and the incidence of ambient light on the mirror member 24.

Instead of the mirror member 24, in the flow path device 2 of the present example, a non-reflective member that does not reflect the light emitted by the optical sensor 3 may be arranged in the region that overlaps with the first flow path 5 and the second flow path 6 on the opposite side of the optical sensor 3 with respect to the first flow path 5 and the second flow path 6. Arranging a non-reflective member allows, a part of light emitted from the optical sensor 3 reflected by the first particles contained in the first flow path 5 or reflected by the interface of the first flow path 5 and the second flow path 6 (the ceiling surface seen from the optical sensor 3 side) to be received by the optical sensor 3. Thus, the reflection from the interface can be measured and the DC offset can be optically performed, and the light reflected by the first particles can be satisfactorily received. In addition, since the ambient light incident on the first flow path 5 and the second flow path 6 from the opposite side of the optical sensor 3 can be blocked by the non-reflective member, the optical noise can be removed and the accuracy of measurement by the optical sensor 3 can be made satisfactory. As the non-reflective member, for example, a non-reflective cloth or the like can be used. In addition, a matte paint such as black may be applied to form a non-reflective member.

When a non-reflective member is arranged in place of the mirror member 24, the non-reflective member is preferable to be an integral one that covers both the first flow path 5 and the second flow path 6 over the entire region to be measured by the optical sensor 3.

Figure 8A:
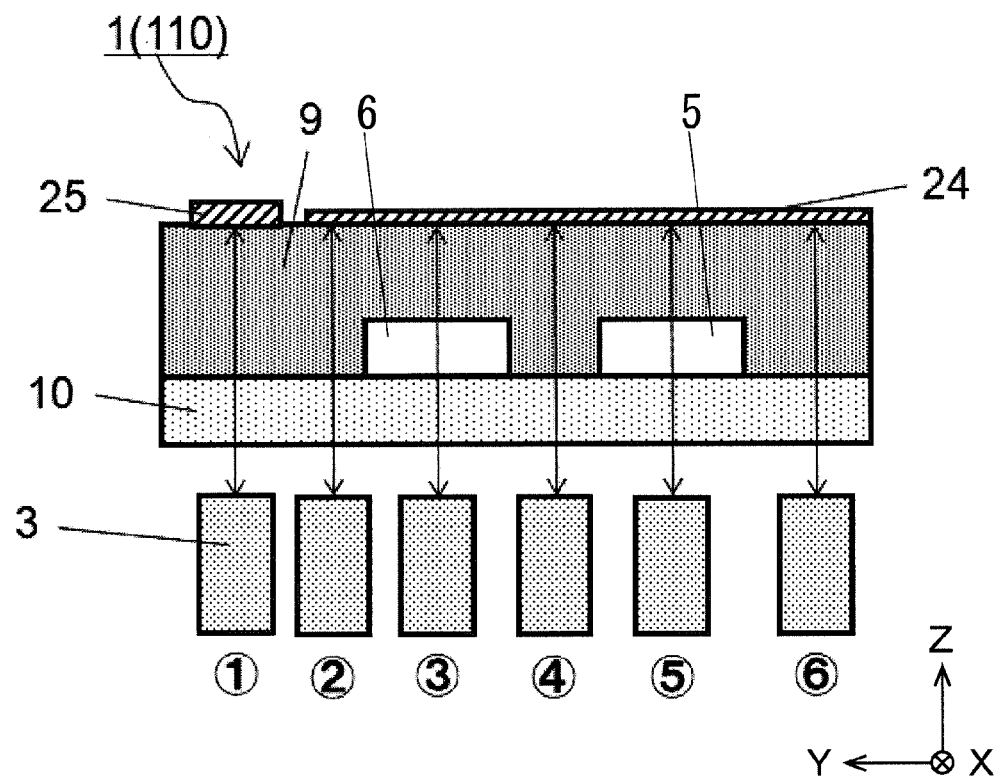
FIGS. 8A and 8B illustrate an example of a measuring apparatus as a specimen treatment device in the specimen introduction method of the present disclosure.

The flow path device 2 of the present example may have a non-reflective region as shown in the cross-sectional view in FIG. 8A. The non-reflective region is a portion where the first flow path 5 and the second flow path 6 are not provided in the flow path device 2, and a region where the mirror member 24 is not arranged when viewed from above. Then, in this non-reflective region, a non-reflective member 25 for reference that does not reflect the light emitted by the optical sensor 3 may preferably be arranged. The non-reflective member 25 can be used for calibrating the light receiving element 8 of the optical sensor 3 and serves as a reference at the time of measuring with the optical sensor 3. Using the intensity of the reflected light by the non-reflective member 25 as a reference allows reducing the influence of noise generated when the optical sensor 3 is used. As the non-reflective member 25, for example, a non-reflective cloth or the like may be installed, and a black matte paint or the like may be applied to form the non-reflective member 25.

In addition, the non-reflective member 25 may be arranged on the lower surface of the second substrate 10 corresponding to the non-reflective region in a region that does not overlap with the first flow path 5 and the second flow path 6. Also in this case, the influence of noise generated when the optical sensor 3 is used can be reduced by using the intensity of the reflected light by the non-reflective member 25 as a reference.

As schematically shown in a block diagram in FIG. 3, the measuring apparatus 1 of the present example further includes a first pump 26 for supplying the first liquid L1 to the first flow path 5, a second pump 27 for supplying the second liquid L2 to the second flow path 6, and a third pump 28 for supplying a gas to the third flow path 22. The first pump 26, the second pump 27 and the third pump 28 respectively lead to the first opening 11, the second opening 18, and the third opening 23 through a plurality of other flow paths (not shown) such as tubes.

(Optical Sensor)

Figure 7:
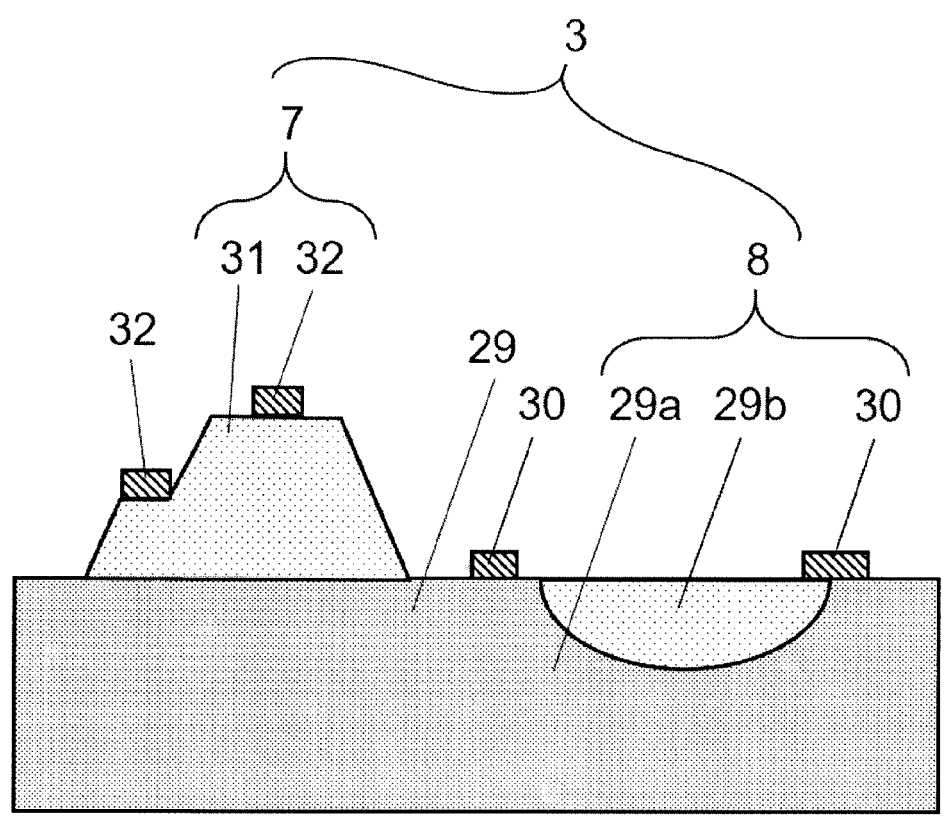
FIG. 7 illustrates a cross-sectional view showing an example of an optical sensor in a measuring apparatus as a specimen treatment device in the specimen introduction method of the present disclosure.

FIG. 7 schematically shows an example of the optical sensor 3. FIG. 7 is an enlarged cross-sectional view of the optical sensor 3 shown in FIG. 4.

The optical sensor 3 is a sensor for measuring the first particles. As described above, the optical sensor 3 includes a light emitting element 7 and a light receiving element 8. The light receiving element 8 of the present example includes a semiconductor substrate 29 including a one conductive type region 29a and another conductive type region 29b on the upper surface, and a pair of first electrodes 30. The light emitting element 7 of the present example includes a plurality of semiconductor layers 31 arranged apart from a portion that functions as the light receiving element 8 of the semiconductor substrate 29, and a pair of second electrodes 32.

The optical sensor 3 is installed to be movable in the plane direction with respect to the surface of the flow path device 2. Thus, the measuring apparatus 1 can irradiate the first flow path 5 and the second flow path 6 with light in order while moving the optical sensor 3 and measure the intensity of individual light for each flow path. The optical sensor 3 of the present example is positioned below the flow path device 2.

(Control Unit)

The control unit 4 can control the measuring apparatus 1. Specifically, the control unit 4 can also control the drive of the optical sensor 3, the first pump 26, the second pump 27, the third pump 28, and the like. The control unit 4 can drive the first pump 26 to allow the first liquid L1 to flow into the first flow path 5. In addition, the control unit 4 can drive the second pump 27 to allow the second liquid L2 to flow into the second flow path 6. In addition, the control unit 4 can drive the third pump 28 to allow the gas to flow into the third flow path 22. The control unit 4 is configured by combining various circuits.

Figure 8B:
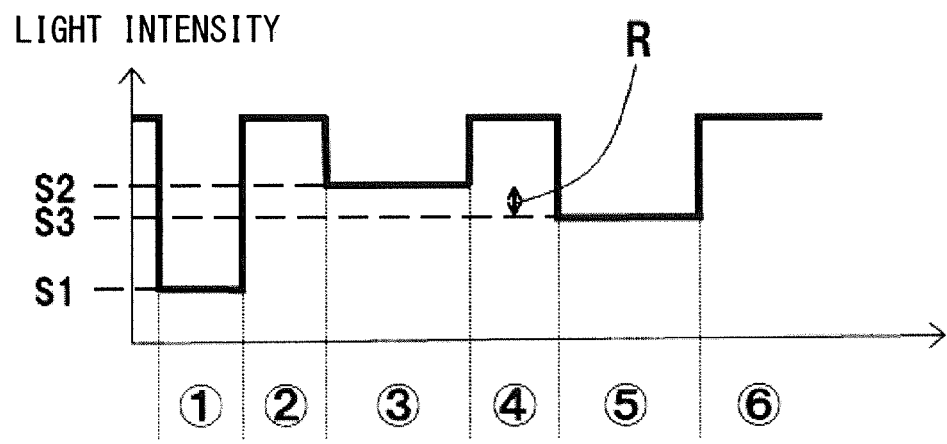

FIGS. 8A and 8B schematically show an example of the measuring apparatus 1. FIG. 8A is a cross-sectional view of the measuring apparatus 1 taken along line B-B shown in FIGS. 2 and 5. FIG. 8B is a diagram illustrating a measurement mechanism.

The control unit 4 can calculate the measurement result based on the output result of the optical sensor 3. As described above, the control unit 4 can measure the first particle in the first flow path 5 by comparing the intensity of the light passing through the first flow path 5 and the intensity of the light passing through the second flow path 6.

First, the optical sensor 3 measures the intensity of light corresponding to the non-reflective member 25 in the non-reflective region, and outputs a reference signal S1 (circled number 1 in the drawing). Next, the optical sensor 3 measures the intensity of the light (reflected light from the mirror member 24 or the non-reflective member 25) passing through the first substrate 9 and the second substrate 10 in the portion before reaching the second flow path 6. However, this is not particularly necessary for measurement (circled number 2). Next, the optical sensor 3 measures the intensity of the light (reflected light from the mirror member 24 or the non-reflective member 25) passing through the second flow path 6 and outputs a measurement signal S2 (circled number 3). This measurement signal S2 is a signal that can be used as the calibration signal S2 when the reference signal S1 is not used. Next, the optical sensor 3 measures the intensity of the light (reflected light from the mirror member 24 or the non-reflective member 25) passing through the first substrate 9 and the second substrate 10 in the portion between the second flow path 6 and the first flow path 5. However, this is not particularly necessary for measurement (circled number 4) either. Next, the optical sensor 3 measures the intensity of the light (reflected light from the mirror member 24 or the non-reflective member 25, but when the non-reflective member 25 is arranged, for example, reflected light from the first particles and the interface (ceiling surface) of the first flow path 5 other than the light substantially not reflected by the non-reflective member 25) passing through the first flow path 5 and outputs a measurement signal S3 (circled number 5). After that, the optical sensor 3 measures the intensity of the light (reflected light from the mirror member 24 or the non-reflective member 25) passing through the first substrate 9 and the second substrate 10 in the portion past the first flow path 5. However, this is also not particularly necessary for measurement (circled number 6).

Next, the measured value R (=(S2−S1)−(S3−S1)=S2−S3) obtained by subtracting the difference between the measurement signal S3 on the first flow path 5 and the reference signal S1 (S3−S1) from the difference between the measurement signal S2 on the second flow path 6 and the reference signal S1 (S2−S1) is calculated. Then, comparing the measured value R with the value of the calibration curve stored in the control unit 4 in advance allows estimating the number of the first particles in the first liquid L1 in the first flow path 5.

It should be noted that the above measurement mechanism is the same when the non-reflective member 25 is arranged on the optical sensor 3 side (lower surface of the second substrate 10) of the flow path device 2.

Here, when the difference between the reference signal S1 and the measurement signals S2 and S3 corresponding to the light loss due to the measurement target is sufficiently large, it is sufficient that the mirror member 24 being a reflection member is arranged, but when the difference is small, it may be difficult to measure accurately. As a countermeasure against this, it is conceivable to increase the light output of the light emitting element 7 of the optical sensor 3 or to increase the signal amplification factor after receiving light by the light receiving element 8. However, it is often not easy to increase the light output of the light emitting element 7, and there is a limit to the amplification range due to restrictions of the amplifier circuit in order to increase the signal amplification factor. In addition, another method of subtracting a constant output on the signal processing circuit and then amplifying the difference is also conceivable, but when the constant output is subtracted, the signal becomes smaller by that amount, but the noise component remains as it is, so that after the amplification, the noise component may result in being amplified more.

On the other hand, according to the measuring apparatus 1 and the measuring method of the above present example, since the optical signal is optically subtracted during measuring the light output, it is possible to reduce the possibility that light transmitted from the flow path device 2 to go outside is reflected to return, or external light is incident as ambient light. Thus, the DC offset can be set optically for measurement, excess light from the outside can be shielded, and stable measurement can be performed on the flow path device 2. As a result, it is possible to stably perform measurement with good accuracy.

In addition, according to the measuring apparatus 1 and the measuring method of the present example, arranging the non-reflective member 25, the first flow path 5, and the second flow path 6 integrally and measuring while moving the optical sensor 3 so as to scan them allows the desired signal and data to be obtained with one measurement in a short time, so that for example, it is possible to reduce the measurement error caused by the output fluctuation of the light emitting element 7.

In addition, when the calculation on the signal in the control unit 4 is performed with light loss (dB) as, for example, −10×log(measurement signal/reference signal), even if the emission intensity of the light emitting element 7 is changed to a considerable extent, the calculation result is hardly affected and does not change, so that it is possible to perform stable measurement less likely to be affected by deterioration of the light emitting element 7 during long-term use.

In addition, comparing the signals of the circled numbers 2, 4, and 6 described in the above measurement mechanism with each other or with the reference signal S1 and the measurement signals S2 and S3 makes it also possible to check whether the flow path device 2 and the optical sensor 3 are installed at relatively correct positions and angles.

It should be noted that the calibration curve data (standard data) does not necessarily have to be stored in the control unit 4. For example, the standard data may be recorded on another storage medium connected to the control unit 4 via a network, and the storage medium may be accessed so that the standard data may be retrieved for each measurement.

When acquiring the calibration signal S2, the control unit 4 may compare the calibration signal S2 with the calibration signal of the second liquid L2 in the standard data. As a result, if there is a large difference between the two signals, it can be determined that an abnormality has occurred in the measurement. As a result, it helps to collect only accurate measurement data.

For each measurement, the optical sensor 3 may irradiate the first flow path 5 and the second flow path 6 with light to receive the light passing through each of the first flow path 5 and the second flow path 6. In addition, the control unit 4 may compare the intensity of the light passing through the first flow path 5 and the intensity of the light passing through the second flow path 6 for each measurement. As a result, for example, when particles such as white blood cells in blood are measured, slight fluctuations in light output have a large effect on the measurement results, so that having the above configuration makes it possible to improve the measurement accuracy of particles.

When acquiring the calibration signal S2, the control unit 4 may output an error signal if the calibration signal S2 is lower than any reference value. As a result, for example, the life of the light emitting element 7 of the optical sensor 3 can be notified. It should be noted that the reference value may be, for example, a value obtained by subtracting a constant value from the calibration signal ST of the second liquid L2 in the standard data.

The control unit 4 may return the optical sensor 3 to its original position after the optical sensor 3 outputs each of the signals S1, S2, and S3. In addition, the control unit 4 does not have to return the optical sensor 3 to its original position after the optical sensor 3 outputs each of the signals S1, S2, and S3. It should be noted that when the optical sensor 3 is not returned to its original position, the optical sensor 3 may measure from the opposite direction at the next measurement.

The control unit 4 may turn on the optical sensor 3, output the signals S1, S2, and S3, and then turn off the optical sensor 3 while the optical sensor 3 is moving. In addition, the control unit 4 may pulse drive the optical sensor 3 during measurement to make it blink. As a result, deterioration of the light emitting element 7 of the optical sensor 3 can be reduced as compared with the case of continuous lighting.

The control unit 4 may drive the third pump 28 to push out the first liquid L1 after the measurement ends. It should be noted that the determination of the end of measurement may be made when the optical sensor 3 outputs the respective signals S1, S2, and S3. In addition, the determination of the end of measurement may be made after the optical sensor 3 starts moving with respect to the flow path device 2 and returns to the original position. In addition, the determination of the end of measurement may be performed by causing the optical sensor 3 to measure the non-reflective member 25, the first flow path 5, and the second flow path 6, and then to measure the non-reflective member 25 again. In addition, the determination of the end of measurement may be made after a lapse of a certain time from driving the optical sensor 3.

The control unit 4 may drive the third pump 28 after a lapse of a certain period of time after driving the first pump 26. As a result, flowing the gas into the first flow path 5 through the third flow path 22 by the drive of the third pump 28 allows the first liquid L1 that has flowed into the first flow path 5 by the drive of the first pump 26 to be moved and carried in the first flow path 5. As a result, the movement of the first liquid L1 in the first flow path 5 becomes faster, and the measurement efficiency can be improved.

After the first liquid L1 flows into the first flow path 5, the control unit 4 may cause the third pump 28 to change the pressure of the gas in the third flow path 22. As a result, the first liquid L1 that has flowed into the first flow path 5 can be agitated, and the first particles in the first liquid L1 can be agitated. Agitating the first particles in this way allows the measurement accuracy to be improved.

After checking that the first liquid L1 has flowed into the first flow path 5 with the optical sensor 3, the control unit 4 may agitate the first liquid L1 and start agitating the first particles, with the third pump 28. Thus, it is possible to reduce the possibility that the third pump 28 excessively reduces the pressure in the first flow path 5 and the first liquid L1 in the first flow path 5 leaks from the third flow path 22. It should be noted that specifically, the flow of the first particles into the first flow path 5 causes the measurement signal S3 of the optical sensor 3 to be smaller than when the first particles are absent, so that when the measurement signal S3 becomes small, it may be determined that the first liquid L1 has flowed into the first flow path 5.

After driving the first pump, the control unit 4 may agitate the first liquid L1 after a lapse of a certain period of time and start agitating the first particles. Thus, the deterioration of the light emitting element 7 can be reduced. In this case, the start position of agitating the first particles may be in front of the irradiation region of the light emitting element 7. In addition, in this case, after the agitation of the first particles is completed, the third pump 28 may cause the gas to flow into the first flow path 5 through the third flow path 22 and the first liquid L1 to be extruded to the irradiation region of the light emitting element 7.

The control unit 4 may drive the optical sensor 3 while varying the pressure in the first flow path 5 with the third pump 28. That is, the pump connected to the first flow path 5 and the third flow path 22 may be stopped to drive the third pump 28. As a result, it can be checked whether the first particles are agitated. That is, when the first particles are agglutinated, the measurement signal S3 becomes small, and when the first particles are agitated and the agglutination of the first particles disappears, the measurement signal S3 may become large. Therefore, if it is checked that the fluctuation of the measurement signal S3 falls within a certain range, it can be confirmed whether the first particles are agitated. It should be noted that specifically, for example, if the difference between the latest measurement signal S3 (or measured value R) and the same index for the previous five times is ±5% or less, it may be determined that the agitation of the first particles is completed.

The control unit 4 may cause the optical sensor 3 to stand by at a position where the first flow path 5 is measured during agitation of the first particles. Thus, the measurement efficiency can be improved.

In addition, the control unit 4 may blink the optical sensor 3 when the optical sensor 3 is on standby during agitation of the first particles. Thus, the deterioration of the light emitting element 7 can be reduced.

In addition, when the optical sensor 3 is made to stand by during agitation of the first particles, the control unit 4 is better to measure the second flow path 6 after the agitation of the first particles is completed. Thus, the measurement accuracy can be improved.

The control unit 4 may cause the third pump 28 to agitate the first liquid L1, and may cause the second pump 27 to flow the second liquid L2 into the second flow path 6. That is, the control unit 4 may drive the second pump 27 before agitation of the first particles is completed to cause the second liquid L2 to flow into the second flow path 6. As a result, the measurement efficiency can be improved. It should be noted that the second pump 27 may be driven at the same time as the first pump 26 or the third pump 28, or may be driven before the first pump 26 and the third pump 28.

(Measuring Apparatus 1A: Specimen Treatment Device)

Hereinafter, another example of a measuring apparatus in which the liquid supply device of the present disclosure is used will be described.

Figure 9:
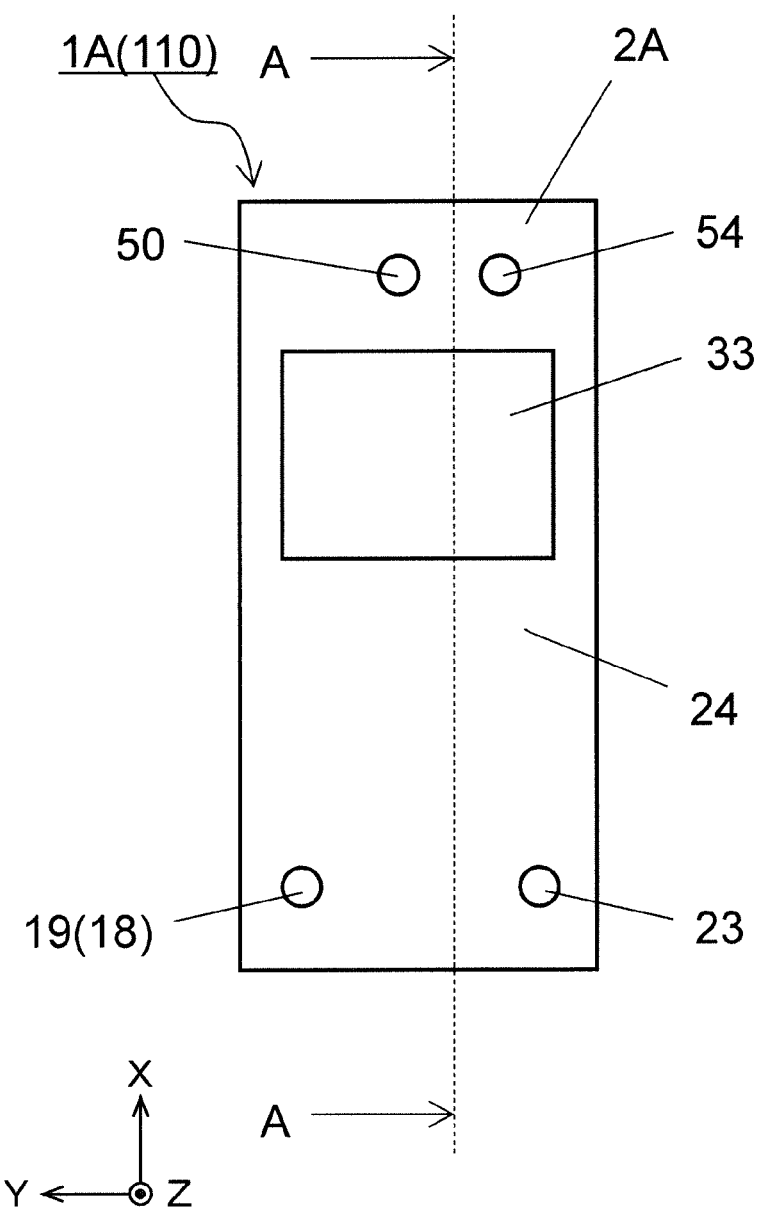
FIG. 9 illustrates a top view showing another example of a measuring apparatus as a specimen treatment device in the specimen introduction method of the present disclosure.
Figure 10:
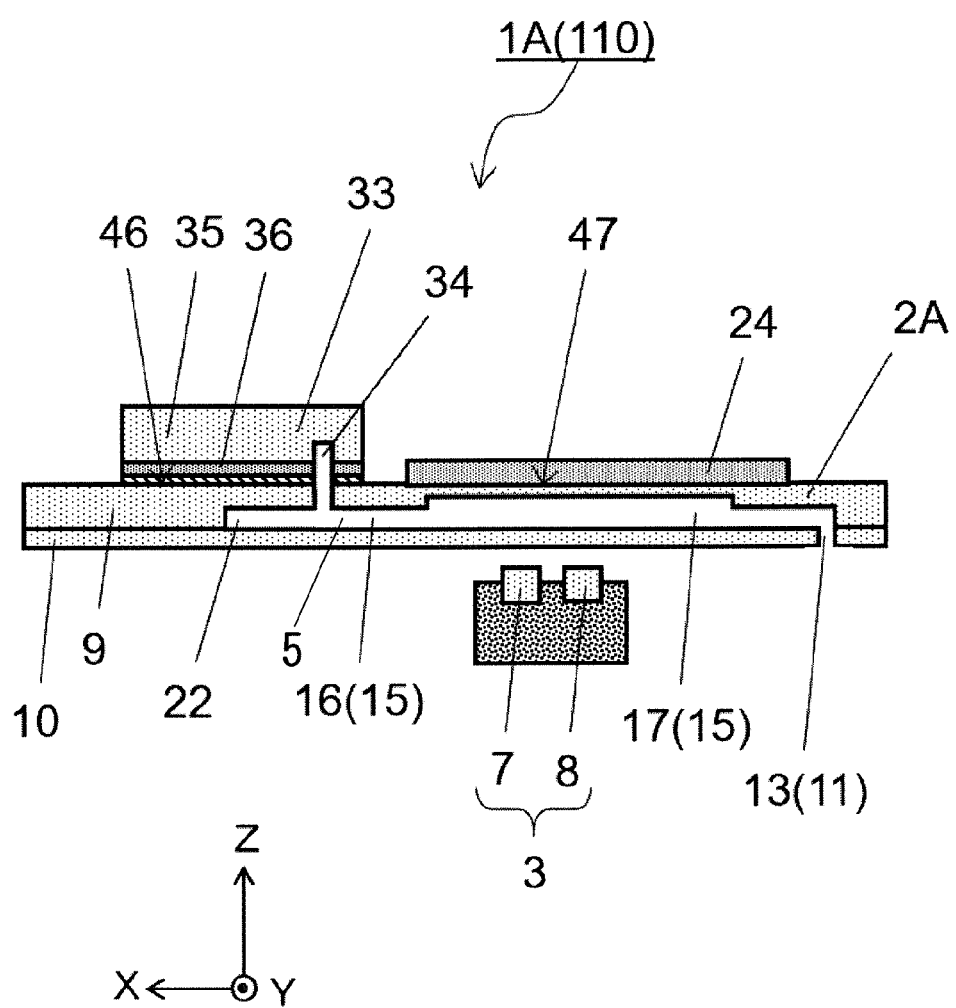
FIG. 10 illustrates a cross-sectional view showing another example of a measuring apparatus as a specimen treatment device in the specimen introduction method of the present disclosure.
Figure 11:
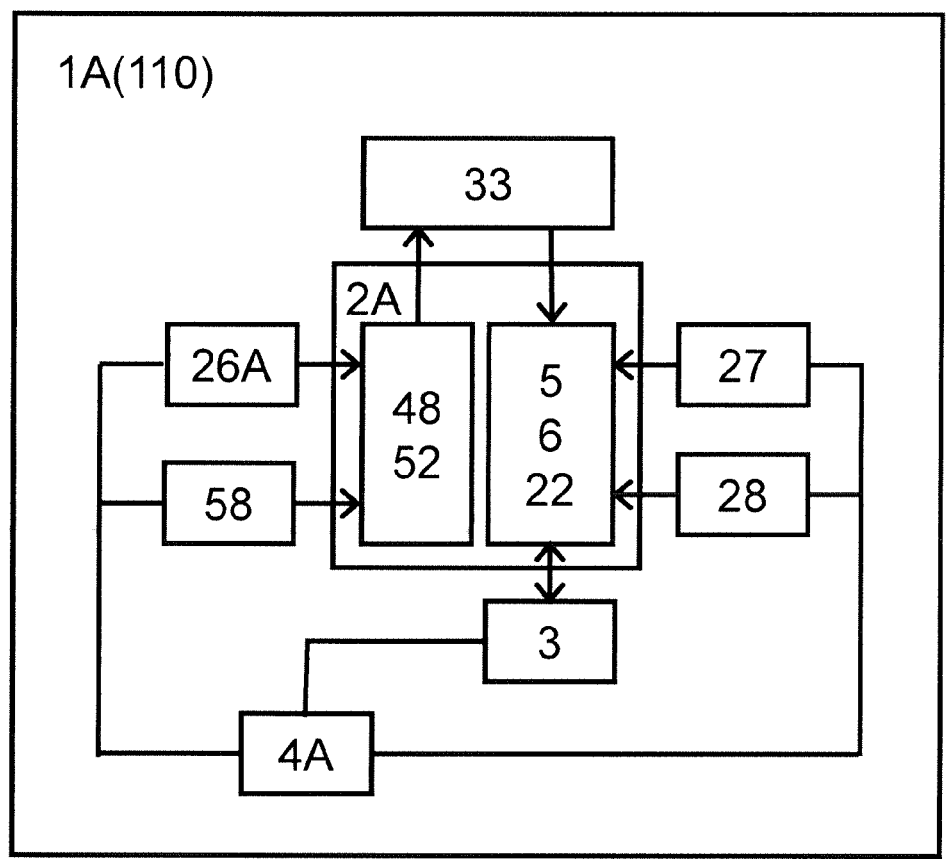
FIG. 11 illustrates a block diagram schematically showing a configuration of another example of a measuring apparatus as a specimen treatment device in the specimen introduction method of the present disclosure.

FIGS. 9 to 11 schematically show the entire measuring apparatus 1A. FIG. 9 is a top view of the measuring apparatus 1A. FIG. 10 is a cross-sectional view of the measuring apparatus 1A, and is a cross-sectional view when the measuring apparatus 1A is cut along line A-A shown in FIG. 9. FIG. 11 is a conceptual diagram of the measuring apparatus 1A, and shows the relationship between each component with a block diagram.

The measuring apparatus 1A further includes a separation flow path device 33 arranged on the upper surface of the flow path device 2A. The separation flow path device 33 is a flow path for separating, taking out, and sorting specific particles from a specimen. Since the measuring apparatus 1A includes the flow path device 2A and the separation flow path device 33, it is possible to separate and sort the first particles to be measured from the specimen in a continuous process, and to improve work efficiency. It should be noted that in the following description of the present example, the flow path device 2A is referred to as "measurement flow path device 2A".

Figure 12:
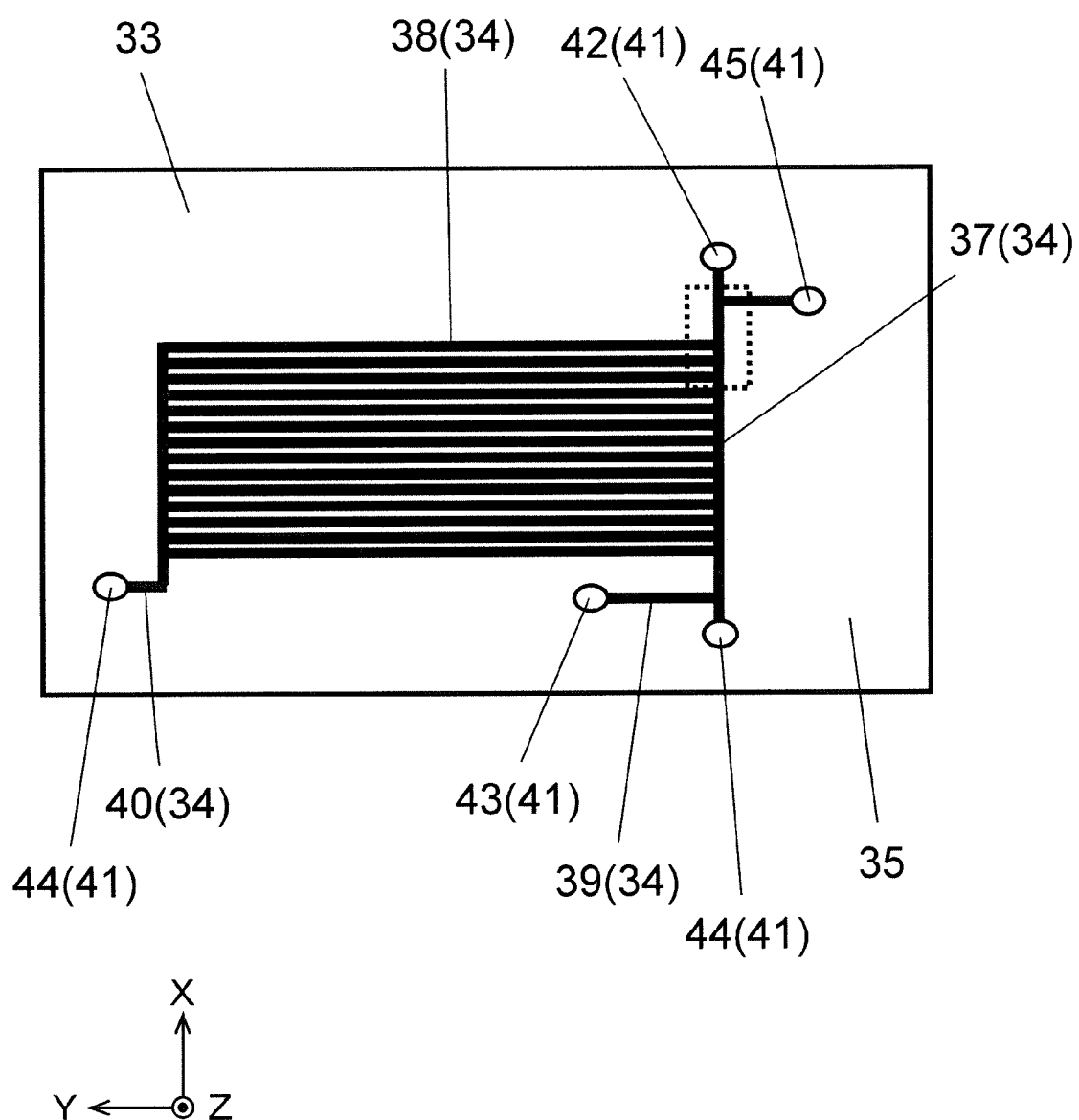
FIG. 12 illustrates a top view showing a part of another example of a measuring apparatus as a specimen treatment device in the specimen introduction method of the present disclosure.
Figure 13:
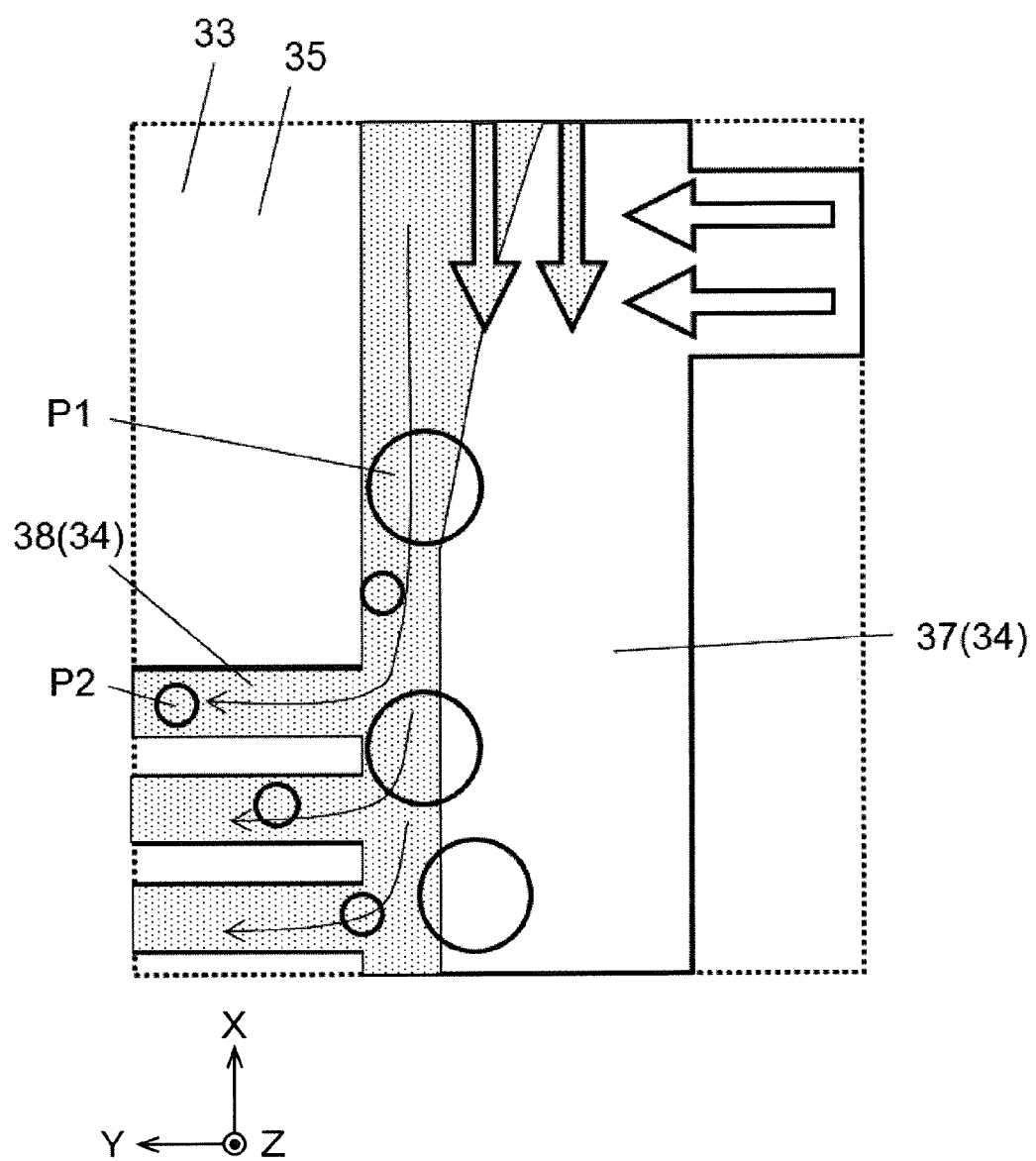
FIG. 13 illustrates a top view showing a part of another example of a measuring apparatus as a specimen treatment device in the specimen introduction method of the present disclosure.

The separation flow path device 33 is schematically shown in FIGS. 12 and 13. FIG. 12 is a top view of the separation flow path device 33. FIG. 13 is an enlarged view of the broken line portion in FIG. 12.

(Separation Flow Path Device)

The separation flow path device 33 can separate, sort to taken out from within the specimen, and collect, the particles contained in the liquid. The separation flow path device 33 includes a fourth flow path 34. Thus, the particles can be separated and collected.

The separation flow path device 33 is, for example, a plate-shaped member. In addition, the planar shape of the separation flow path device 33 is, for example, a rectangular shape, and the surface is a flat surface. It is sufficient that the thickness of the separation flow path device 33 is, for example, 1 to 5 mm. It is sufficient that the planar shape of the separation flow path device 33 has a short side of 10 to 30 mm and a long side of 10 to 50 mm, for example. The separation flow path device 33 can be formed, for example, by injection molding.

The separation flow path device 33 is mainly formed by the third substrate 35 and the fourth substrate 36. Specifically, the separation flow path device 33 includes a third substrate 35 having a groove and a fourth substrate 36 arranged on the surface of the third substrate 35. The fourth substrate 36 closes the opening of the groove of the third substrate 35. That is, the groove of the third substrate 35 and the surface of the fourth substrate 36 form the fourth flow path 34. It should be noted that the separation flow path device 33 may include members other than the third substrate 35 and the fourth substrate 36.

The third substrate 35 and the fourth substrate 36 are, for example, flat plate-shaped members. It is sufficient that the materials of the third substrate 35 and the fourth substrate 36 are, for example, glass, acrylic resin, polycarbonate resin, polydimethylsiloxane (PDMS) resin, or the like. The material of the third substrate 35 and the fourth substrate 36 of the present example is PDMS.

It should be noted that any one of the third substrate 35 and the fourth substrate 36 may be positioned on the upper side, and in the separation flow path device 33 of the present example, the third substrate 35 is arranged on the upper surface of the fourth substrate 36.

The fourth flow path 34 includes a fourth main flow path 37 and a fourth branch flow path 38 branched from the fourth main flow path 37. In the separation flow path device 33 of the present example, the liquid flowing in the separation flow path device 33 flows into the fourth main flow path 37, and only the particles (second particles P2) different from specific particles (first particles P1) flow into the fourth branch flow path 38 from the fourth main flow path 37, whereby specific particles can be separated and collected, and the separated specific particles can be contained in a specimen and collected. It should be noted that the flow of only the specific particles into the fourth branch flow path 38 allows the specific particles to be separated toward the fourth branch flow path 38 and collected.

It should be noted that the fourth branch flow path 38 is designed so that only the second particles P2 branch, but it is not limited thereto. That is, particles different from the second particles P2 may flow into the fourth branch flow path 38.

FIG. 13 schematically shows the state of separation between the first particles P1 and the second particles P2. It should be noted that the larger circle in the drawing indicates the first particle P1, and the smaller circle indicates the second particle P2. In addition, the thick arrow along the X-axis direction is the mainstream, and the thick arrow along the Y-axis direction indicates the "pressing flow" described below. Furthermore, the hatched region in the drawing indicates a "lead-in flow" described below.

The fourth flow path 34 of the present example includes a fourth main flow path 37 and a plurality of fourth branch flow paths 38 connected to one side of the fourth main flow path 37. In the separation flow path device 33, adjusting the cross-sectional area and length of each of the fourth main flow path 37 and the fourth branch flow path 38, the flow velocity of the specimen, and the like allows a "lead-in flow" that flows from the fourth main flow path 37 into the fourth branch flow path 38 to generate in the fourth main flow path 37. Then, in the separation flow path device 33, a pressing flow capable of pressing the specimen flowing in the fourth main flow path 37 toward the fourth branch flow path 38 is generated in the fourth flow path 34. As a result, as shown in FIG. 13, making the width of the lead-in flow larger than the barycentric position of predetermined particles flowing in the specimen and smaller than the barycentric position of other particles allows predetermined particles (here, the second particles P2) to be drawn into the fourth branch flow path 38.

The separation flow path device 33 of the present example is particularly intended to separate red blood cells and white blood cells in the blood. It should be noted that the barycentric position of a red blood cell in blood is, for example, a position of 2 to 2.5 μm from the edge, and the barycentric position of a white blood cell is, for example, a position of 5 to 10 μm from the edge. In this case, it is sufficient that the fourth main flow path 37 has a cross-sectional area of 300 to 1000 μm² and a length of 0.5 to 20 mm, for example. In addition, it is sufficient that the fourth branch flow path 38 has a cross-sectional area of 100 to 500 μm² and a length of 3 to 25 mm, for example. In addition, it is sufficient that the flow velocity in the fourth flow path 34 is 0.2 to 5 m/sec, for example. As a result, the width of the lead-in flow can be set to 2 to 15 and red blood cells and white blood cells can be separated from the blood, for example.

The fourth flow path 34 further includes a fourth collection flow path 39 connected to the fourth main flow path 37, and can collect the first particles P1. In the present disclosure, in the fourth flow path 34, the first particles P1 can be collected in the fourth collection flow path 39 by utilizing the pressing flow.

In addition, the fourth flow path 34 may include a fourth disposal flow path 40 connected to a plurality of fourth branch flow paths 38. The separated second particles P2 may be collected or disposed by the fourth disposal flow path 40. It should be noted that when the first particles P1 are collected by a plurality of fourth branch flow paths 38, one fourth disposal flow path 40 to which the plurality of fourth branch flow paths 38 are connected functions as a flow path for collecting the first particles P1. In addition, in this case, the liquid that has flowed to the end in the fourth main flow path 37 may be disposed.

The fourth flow path 34 has a plurality of fourth openings 41 positioned on the surface of the separation flow path device 33. The plurality of fourth openings 41 includes a fourth specimen inflow port 42 for the specimen to flow into at least the fourth main flow path 37, a fourth specimen outflow port 43 for collecting the first particles from the fourth collection flow path 39, and at least one fourth disposal outflow port 44 for collecting the components obtained by excluding the first particles from the specimen. In addition, in the present example, a fourth pressing inflow port 45 into which the third liquid for pressing the specimen against the fourth branch flow path 38 side flows is also provided. It should be noted that in the present example, the fourth disposal outflow port 44 is connected to the fourth main flow path 37 and the fourth disposal flow path 40. Alternatively, the liquid flowing out from the fourth disposal outflow port 44 is collected through the through hole 44' formed in the second flow path device 2A described below. It should be noted that the fourth specimen outflow port 43 is connected to the first inflow port 12 of the first flow path 5 of the measurement flow path device 2A.

(Measurement Flow Path Device)

Figure 14:
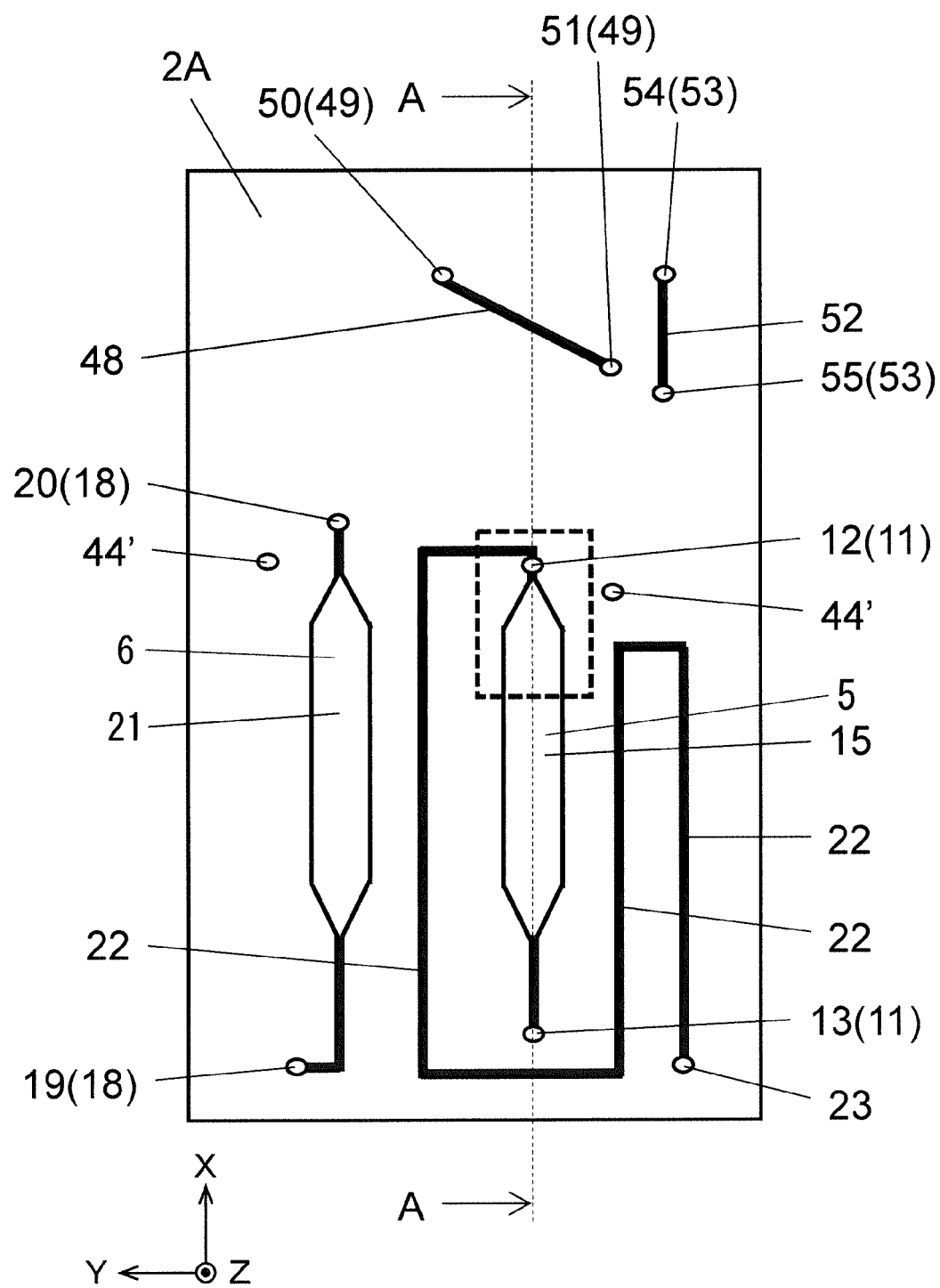
FIG. 14 illustrates a top view showing a part of another example of a measuring apparatus as a specimen treatment device in the specimen introduction method of the present disclosure.

FIG. 14 schematically shows the measurement flow path device 2A. FIG. 14 is a plan view of the measurement flow path device 2A when viewed from above.

Similarly to the example shown in FIG. 10, the upper surface of the measurement flow path device 2A of the present example has a first region 46 in which the separation flow path device 33 is arranged and a second region 47 that does not overlap with the first region 46. When viewed in a plan view, the first flow path 5 of the measurement flow path device 2A is arranged from the first region 46 to the second region 47, and the separation flow path device 33 is arranged only in the first region 46 of the measurement flow path device 2A. Thus, since the first flow path 5 is exposed to the second region 47, the second region 47 can be used as the measurement region. In the present example, the mirror member 24 is arranged in the second region 47.

The measurement flow path device 2A may further include a fifth flow path 48 different from the first flow path 5, the second flow path 6, and the third flow path 22. In addition, the fifth flow path 48 may have a plurality of fifth openings 49 positioned on the surface of the measurement flow path device 2A. The fifth flow path 48 can function as a flow path through which the specimen before particle separation flows.

The plurality of fifth openings 49 include a fifth inflow port 50 and a fifth outflow port 51. The fifth inflow port 50 is an opening for the specimen to flow into the fifth flow path 48. The fifth outflow port 51 is an opening for the specimen to flow out from the fifth flow path 48. The fifth inflow port 50 is exposed, and the fifth outflow port 51 is connected to the fourth specimen inflow port 42 of the separation flow path device 33.

The fifth inflow port 50 and the fifth outflow port 51 are positioned on the upper surface of the measurement flow path device 2A (the upper surface of the first substrate 9). In the present example, the fifth inflow port 50 is positioned on the same surface as the first inflow port 12. In addition, in the present example, the fifth outflow port 51 is positioned on the same surface as the first inflow port 12, and is positioned on the same surface as the fifth inflow port 50 of the plurality of fifth openings 49 and the third opening 23.

The measurement flow path device 2A may further include a sixth flow path 52 different from the first flow path 5, the second flow path 6, the third flow path 22, and the fifth flow path 48. The sixth flow path 52 has a plurality of sixth openings 53 positioned on the surface of the measurement flow path device 2A. The plurality of sixth openings 53 include a sixth inflow port 54 and a sixth outflow port 55. The sixth inflow port 54 is an opening for the third liquid for the pressing flow in the separation flow path device 33 to flow into the sixth flow path 52. The sixth outflow port 55 is an opening for the third liquid to flow out from the sixth flow path 52. The sixth inflow port 54 is exposed, and the sixth outflow port 55 is connected to the fourth pressing inflow port 45 of the separation flow path device 33.

As shown in FIG. 11, the measuring apparatus 1A of the present example further includes a first pump 26A for supplying the first liquid L1 to the fifth flow path 48 and a fourth pump 58 for supplying the third liquid to the sixth flow path 52. It should be noted that the first pump 26A corresponds to the first pump 26 in the above example. That is, the first pump 26A supplies the first liquid L1 to the first flow path 5 through the fifth flow path 48 and the fourth flow path 34 in this order. The first pump 26A, the second pump 27, the third pump 28, and the fourth pump 58 respectively lead to the fifth opening 49, the second opening 18, the third opening 23, and the sixth opening 53 through a plurality of other flow paths (not shown) such as tubes.

The control unit 4A can control the measuring apparatus 1A. Specifically, the control unit 4A can also control the drive of the optical sensor 3, the first pump 26A, the second pump 27, the third pump 28, the fourth pump 58, and the like. The control unit 4A can drive the first pump 26A to allow a liquid containing specific particles to flow into the first flow path 5 as the first liquid L1. In addition, the control unit 4A can drive the second pump 27 to allow a liquid containing no specific particles to flow into the second flow path 6 as the second liquid L2. In addition, the control unit 4A can drive the third pump 28 to allow gas to flow into the third flow path 22. The control unit 4A is configured by combining various circuits.

The control unit 4A preferably causes the specimen to flow into the fourth main flow path 37 of the fourth flow path 34 after causing the third liquid to flow into the fourth main flow path 37 of the fourth flow path 34. It is sufficient that the control unit 4A drives the fourth pump 58 to cause the third liquid to flow into the fourth main flow path 37, and then drives the first pump 26 to cause the specimen to flow into the fourth main flow path 37.

The present disclosure is not limited to the examples of the embodiments described above. In addition, various changes and improvements can be made without departing from the gist of the present disclosure.

Figure 15:
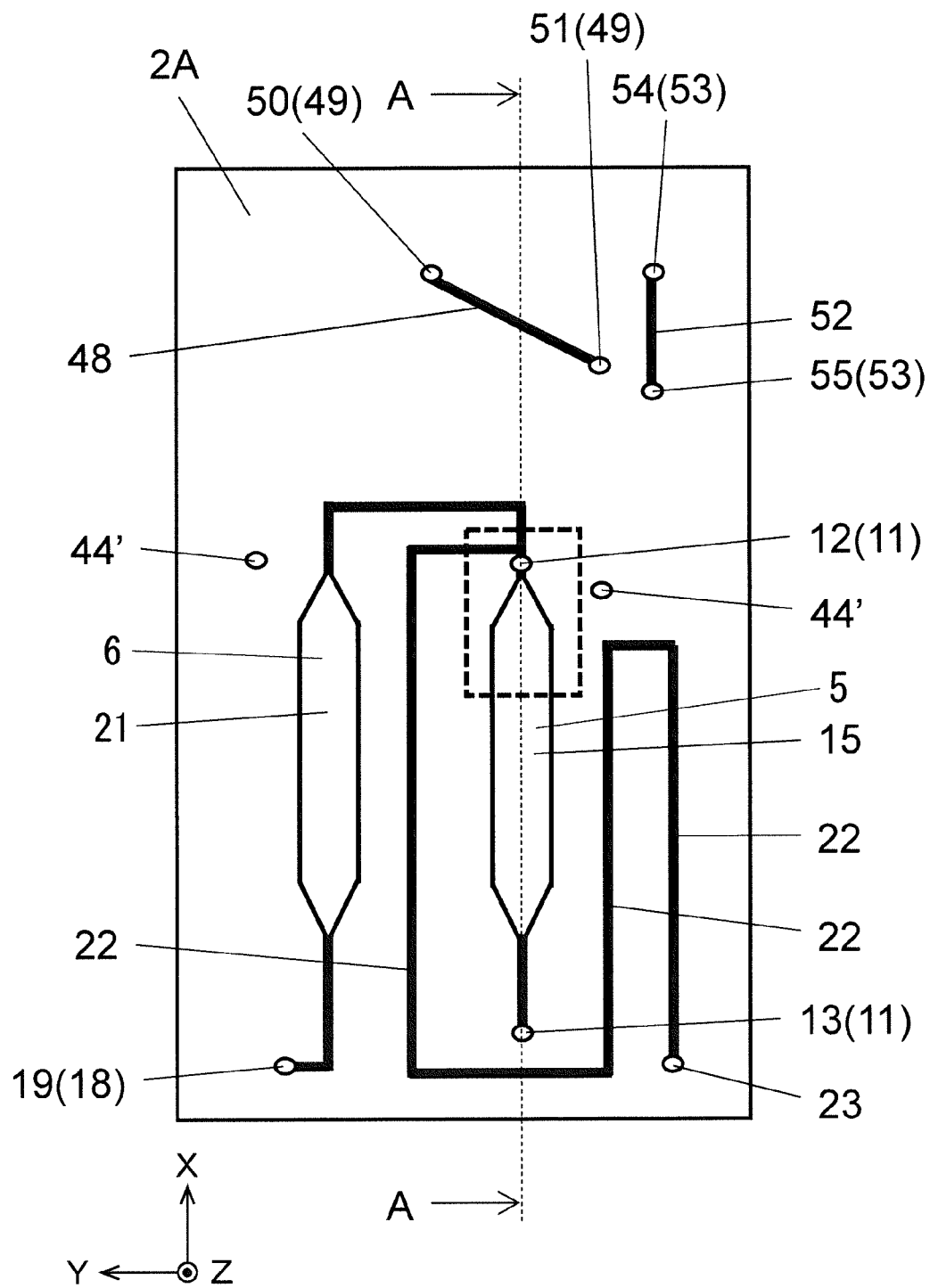
FIG. 15 illustrates a top view showing a part of another example of a measuring apparatus as a specimen treatment device in the specimen introduction method of the present disclosure.

In the above-described example, an example in which one end of the second flow path 6 has the second outflow port 20 is described, but as shown in FIG. 15, one end of the second flow path 6 may be connected to the first flow path 5. When the second flow path 6 is connected to the first flow path 5, the second liquid L2 can be caused to flow into the first flow path 5 through the second flow path 6. As a result, when the amount of the first liquid L1 flowing into the first flow path 5 is small, the second liquid L2 can be replenished from the second flow path 6 to the first flow path 5. It should be noted that in this case, the second liquid L2 may be the same liquid as the third liquid.

In addition, when the second flow path 6 is connected to the first flow path 5, the control unit 4 (or the control unit 4A) may cause a fixed amount of the second liquid L2 to flow into the first flow path 5 before the first liquid L1 reaches the first flow path 5. As a result, it is possible to quantitatively measure to what degree the first particles are contained in a certain amount of solvent.

When causing the second liquid L2 to flow into the first flow path 5, the control unit 4 (or the control unit 4A) may cause the optical sensor 3 to check the presence or absence of the liquid. In this case, after driving the second pump 27 to cause the second liquid L2 to flow into the second flow path 6, the control unit 4 (or the control unit 4A) may drive the optical sensor 3 and the first pump 26 (or the first pump 26A and the fourth pump 58) to cause the first liquid L1 to flow into the first flow path 5 (and the liquid to flow into the sixth flow path 52). In addition, after driving the first pump 26 (or the first pump 26A and the fourth pump 58), the control unit 4 (or the control unit 4A) may drive the second pump 27 within a certain period of time.

In addition, when the first flow path 5 is connected to the second flow path 6, the third flow path 22 may be connected to the connected portion between the first flow path 5 and the second flow path 6. In this case, it is advisable that first, after causing the second liquid L2 to flow into the first flow path 5, the control unit 4 (or the control unit 4A) causes the first liquid L1 to flow into the first flow path 5, and next, causes the gas to flow into the first flow path 5. Thus, it is possible to reduce the possibility that the first liquid L1 flows into the second flow path 6.

In addition, the gas may be caused to flow into the first flow path 5, the second liquid L2 existing from the second flow path 6 to the first flow path 5 may be divided, and then the first liquid L1 may be caused to flow into the first flow path 5. In this case, it is sufficient that the control unit 4 (or the control unit 4A) drives the second pump 27, and next drives the third pump 28 and next, drives the first pump 26.

In the above-described example, an example in which the third liquid is supplied from the sixth flow path 52 to the fourth flow path 34 has been described, but the third liquid may be supplied from the second flow path 6 instead of the sixth flow path 52. In this case, the second liquid L2 and the third liquid are the same liquid. That is, the sixth flow path 52 does not exist, and one end of the second flow path 6 is connected to the fourth pressing inflow port 45 of the fourth flow path 34.

In the above-described example, the example in which the separation flow path device 33 includes the third substrate 35 and the fourth substrate 36 has been described, but a sheet member may be caused to function as the fourth substrate 36 instead of the fourth substrate 36.

Supplying the first liquid and the second liquid to the specimen treatment device and the measuring apparatus as described above through the liquid supply device of the present disclosure allows even a large number of first liquids to be tested, to be easily coped with, and the cost of equipment to be tested, to be reduced.

The invention claimed is:

1. A method for introducing a specimen into a specimen treatment device, the specimen treatment device including a first inflow port and a second inflow port and being internally configured to flow a plurality of liquids between the first inflow port and the second inflow port, the method being a method for introducing a first liquid of the plurality of liquids being the specimen to be tested and a second liquid of the plurality of liquids to be compared into the first inflow port and the second inflow port of the specimen treatment device respectively, the method comprising:

by using a switching member configured to switch a liquid flow path between two inlets-and-outlets of a first inlet-and-outlet, a second inlet-and-outlet, and a third inlet-and-outlet, connecting a first feeder configured to supply the first liquid to the first inlet-and-outlet, connecting the second inlet-and-outlet to a discharge container, connecting the third inlet-and-outlet to the first inflow port of a specimen treatment device, and further connecting a second feeder configured to supply the second liquid to the second inflow port of the specimen treatment device;

enabling the switching member to flow at least one liquid of the plurality of liquids between the second inlet-and-outlet and the third inlet-and-outlet, and sending out the second liquid from the second feeder to the discharge container through the second inflow port, the specimen treatment device, the first inflow port, and the switching member to fill a second path from the second feeder to the switching member with the second liquid;

enabling the switching member to flow at least one liquid of the plurality of liquids between the first inlet-and-outlet and the second inlet-and-outlet, and sending out the first liquid from the first feeder to the discharge container through the switching member to fill a first path from the first feeder to the switching member with the first liquid; and subsequently enabling the switching member to flow at least one liquid of the plurality of liquids between the first inlet-and-outlet and the third inlet-and-outlet, sending out the first liquid from the first feeder through the switching member to introduce the first liquid into the first inflow port, and sending out the second liquid from the second feeder to introduce the second liquid into the second inflow port.

2. The method for introducing the specimen into the specimen treatment device according to claim 1, further comprising:

a flow rate for sending out the second liquid from the second feeder to the discharge container is defined as a first flow rate, a flow rate for sending out the first liquid from the first feeder to the discharge container is defined as a second flow rate, a flow rate for sending out the first liquid from the first feeder into the first inflow port is defined as a third flow rate, a flow rate for sending out the second liquid from the second feeder into the second inflow port is defined as a fourth flow rate, and the first flow rate is larger than the fourth flow rate and the second flow rate and the third flow rate are smaller than the fourth flow rate.

3. The method for introducing the specimen into the specimen treatment device according to claim 2, further comprising using, for the specimen treatment device, a particle separation device internally including a main flow path and a branch flow path for separating particles in blood, using the blood for the first liquid to be introduced into the first inflow port as the specimen, and using physiological saline for the second liquid to be introduced into the second inflow port for particle separation.

4. The method for introducing the specimen into the specimen treatment device according to claim 1, further comprising using, for the specimen treatment device, a particle separation device internally including a main flow path and a branch flow path for separating particles in blood, using the blood for the first liquid to be introduced into the first inflow port as the specimen, and using physiological saline for the second liquid to be introduced into the second inflow port for particle separation.

* * * * *